(12) United States Patent
Tonkovich et al.

(10) Patent No.: US 9,527,057 B2
(45) Date of Patent: Dec. 27, 2016

(54) LAMINATED, LEAK-RESISTANT CHEMICAL PROCESSORS; METHODS OF MAKING, AND METHODS OF OPERATING

(75) Inventors: Anna Lee Tonkovich, Gilbert, AZ (US); Thomas Yuschak, Lewis Center, OH (US); Paul W. Neagle, Westerville, OH (US); Jennifer L. Marco, London, OH (US); Jeffrey D. Marco, London, OH (US); Michael A. Marchiando, London, OH (US); Lane W. Keyes, Columbus, OH (US); Soumitra Deshmukh, Dublin, OH (US); Robert J. Luzenski, Marysville, OH (US)

(73) Assignee: Velocys, Inc., Plain City, OH (US)

( * ) Notice: Subject to any disclaimer, the term of this patent is extended or adjusted under 35 U.S.C. 154(b) by 1094 days.

(21) Appl. No.: 13/276,311

(22) Filed: Oct. 18, 2011

(65) Prior Publication Data
US 2012/0132290 A1 May 31, 2012

Related U.S. Application Data

(60) Provisional application No. 61/394,328, filed on Oct. 18, 2010, provisional application No. 61/441,276, filed on Feb. 9, 2011.

(51) Int. Cl.
*B32B 37/00* (2006.01)
*B32B 37/02* (2006.01)
(Continued)

(52) U.S. Cl.
CPC .............. *B01J 19/0093* (2013.01); *B23K 1/00* (2013.01); *B23K 1/0012* (2013.01); *B23K 26/24* (2013.01);
(Continued)

(58) Field of Classification Search
CPC ....... B32B 37/02; B32B 37/00; B01J 19/0093; B01J 19/00; B23K 1/00; B23K 1/0012; B23K 26/24; B23K 1/0008; B23K 26/00; B23K 26/20; B23K 26/21
(Continued)

(56) References Cited

U.S. PATENT DOCUMENTS 5,152,060 A * 10/1992 Schubert et al. ........ 29/890.039
6,220,497 B1   4/2001 Benz et al.
(Continued)

FOREIGN PATENT DOCUMENTS

JP    68-128236    7/1983

OTHER PUBLICATIONS

International Preliminary Report on Patentability from PCT/US2011/056789 mailed May 2, 2013.
(Continued)

*Primary Examiner* — Natasha Young
(74) *Attorney, Agent, or Firm* — Frank Rosenberg

(57) ABSTRACT

The invention provides methods of making laminated devices (especially microchannel devices) in which plates are assembled and welded together. Unlike conventional microchannel devices, the inventive laminated devices can be made without brazing or diffusion bonding; thus providing significant advantages for manufacturing. Features such as expansion joints and external welded supports are also described. Laminated devices and methods of conducting unit operations in laminated devices are also described.

22 Claims, 19 Drawing Sheets

(51) Int. Cl.
*B01J 19/00* (2006.01)
*B23K 1/00* (2006.01)
*B23K 26/00* (2014.01)
*B23K 26/20* (2014.01)
*B23K 26/21* (2014.01)
*B23K 26/24* (2014.01)

(52) U.S. Cl.
CPC .............. *B01J 2219/0099* (2013.01); *B01J 2219/00783* (2013.01); *B01J 2219/00806* (2013.01); *B01J 2219/00808* (2013.01); *B01J 2219/00817* (2013.01); *B01J 2219/00822* (2013.01); *B01J 2219/00835* (2013.01); *B01J 2219/00898* (2013.01); *B01J 2219/00988* (2013.01); *B23K 2201/14* (2013.01); *B23K 2203/02* (2013.01); *Y10T 137/0396* (2015.04); *Y10T 156/10* (2015.01); *Y10T 428/24562* (2015.01); *Y10T 428/24802* (2015.01)

(58) Field of Classification Search
USPC ............... 422/602; 428/166, 195.1; 402/602
See application file for complete search history.

(56) References Cited

U.S. PATENT DOCUMENTS

| | | | |
|---|---|---|---|
| 6,238,805 B1 * | 5/2001 | Barth ............................ 428/594 |
| 6,289,977 B1 | 9/2001 | Claudel et al. | |
| 6,989,134 B2 | 1/2006 | Tonkovich et al. | |
| 7,900,811 B1 | 3/2011 | Alman et al. | |
| 8,029,748 B2 | 10/2011 | Mazanec et al. | |
| 8,057,743 B2 | 11/2011 | Nokihara et al. | |
| 8,252,245 B2 | 8/2012 | Arora | |
| 8,503,849 B2 * | 8/2013 | Decorby ........................ 385/131 |
| 2001/0051201 A1 * | 12/2001 | Schubert et al. ............. 426/522 |
| 2002/0176804 A1 | 11/2002 | Strand et al. | |
| 2004/0099712 A1 | 5/2004 | Tonkovich et al. | |
| 2006/0231588 A1 | 10/2006 | Sato et al. | |
| 2007/0125489 A1 * | 6/2007 | Paul et al. ................. 156/272.8 |
| 2007/0158050 A1 * | 7/2007 | Norley et al. ............... 165/80.4 |
| 2012/0291991 A1 | 11/2012 | Denkenberger | |

OTHER PUBLICATIONS

Cornell, Scott, et al., "Humping Reduction Methods for High Speed Laser Welding", Paper (M405), Mound Laser & Photonics Center Inc., Miamisburg, Ohio 45343, Presented at The International Congress on Applications of Lasers & Electro-Optics (ICALEO®), Orlando, Florida, 2009.

Delsman, E.R. et al., "Design and Operation of a preferential oxidation microdevice for a portable fuel processor", Chemical Engineering Science, 59 (2004) 4795-4802.

Elsherbini, A.I.,et al. "Experimental investigation of thermal contact resistance in plain-fin-and-tube evaporators with collarless fins", International Journal of Refrigeration, 26 (2003) 527-536.

Garcia, C. et al. "Intergranular corrosion of welded joints of austenitic stainless steels studied by using an electrochemical minicell", Corrosion Science 50 (2008) 2390-2397.

Kwok, C.T., "Pitting and galvanic corrosion behavior of laser-welded stainless steels", Journal of Materials Processing Technology 176 (2006) 168-178.

Messler, "Chapter 6, Welding as a Joining Process", Principles of Welding: Physics, Chemistry and Metallurgy, 1st edition, May 1999, pp. 285-348, Wiley, Hoboken, New Jersey.

Nielsen, C.B., "Mechanical testing of laser welded microseams", Multi-Material Micro Manufacture, W. Menz et al. (Eds), 2006 Elsevier, Ltd.

O'Connell, Martin O., et al."The development and evaluation of microstructured reactors for the water gas shift and preferential oxidation reactions in the 5 kW range", International Journal of Hydrogen Energy 35 (2010) 2317-2327.

Pantsar, Henrikki et al.,"Quality and costs analysis of laser welded all steel sandwich panels" Journal of Laser Applications, vol. 16, No. 2, May 2004.

Penasa, M., "Application of the laser welding process to low thickness stainless steels" Welding International 2003 17 (12) 947-957.

Quintino, L. et al. "Welding with high power fiber lasers—A preliminary study", Materials and Design 28 (2007) 1231-1237.

Synytnikov, P.V., "Design, scale-out, and operation of a microchannel reactor with a Cu/CeO2-x catalytic coating for preferential CO oxidation", Chemical Engineering Journal 160 (2010) 923-929.

Sterling, Colin J., "Effects of Friction Stir Processing on the Microstructure and Mechanical Properties of Fusion Welded 304L Stainless Steel" (2004). All Theses and Dissertations. Paper 46. http://scholarsarchive.byu.edu/etd/46.

Taylor, Paul A. et al., "A Multi-level code for Metallurgical Effects in Metal-Forming Processes", Sandia Report, Report No. SAND97-2019, Publication Date Aug. 1, 1997, DOI: 10.2172/527560.

Zhang Y.M. et al., "Control of Dynamic keyhole welding process", Automatica 43 (2007) 876-884.

Drost, Kevin, "Overview of Microchannel-based Energy and Chemical Systems", Presentation at the 1st PTT RTI Microreaction Technology Seminar 2010, Bangkok, Thailand, Sep. 2010.

International Search report from International Application No. PCT/US2011/056789 issued Jun. 29, 2012.

Written Opinion from PCT/US2011/056789 issued Jun. 29, 2012.

Australian Application No. 2011317159, Patent Examination Report 1 dated Dec. 15, 2014.

Chinese Application No. 201180060854.3, Notice of First Office Action dated Oct. 13, 2014.

Official Action from CN Patent Application No. 201180060854.3 dated Aug. 28, 2015, English translation.

Chinese Official Action dated Aug. 28, 2015 from CN Application No. 201180060854.3.

Decision of Rejection from JP Patent Application 2013-535022 mailed on Jul. 26, 2016, with English translation.

Examination Report under Section 18(3) from GB Application No. GB1307497.6 mailed on Sep. 30, 2016.

* cited by examiner

LAMINATED, LEAK-RESISTANT CHEMICAL PROCESSORS; METHODS OF MAKING, AND METHODS OF OPERATING

RELATED APPLICATIONS

This application claims priority to U.S. Provisional Patent Application Ser. Nos. 61/394,328 filed 18 Oct. 2010 and 61/441,276 filed 9 Feb. 2011.

INTRODUCTION

The conventional thinking in microchannel technology is that optimal heat transfer in a microchannel heat exchanger can only be obtained by diffusion bonding and/or brazing. These methods rely on the formation of a contiguous metallic interfaces between the layers. The contiguous interface eliminates a thermal contact resistance between layers and is believed to be necessary for moving high levels of heat from an exothermic reaction to heat removal chambers or to add heat to an endothermic reaction.

Brazing requires the addition of an interlayer material which melts at a temperature below the melting temperature of the materials of construction. The interlayer becomes liquid during the diffusion brazing or brazing process. The liquid interlayer flows to fill gaps or voids such that the materials are joined together. As the interlayer flows it also experiences diffusion, where materials from the interlayer may diffuse into the parent material and material from parent may diffuse into the interlayer. As the diffusion progresses the local composition of the interlayer material changes. Further, as the temperature is dropped after achieving a maximum temperature, the liquid interlayer will solidify and fill the voids between the two parent layers. Solidification may be driven by temperature or composition. In the latter case a melting point depressant, such as phosphorous or boron, is added to cause the composite interlayer to melt at a lower temperature than the parent material. In an analogous example, a diffusion bonded device also forms intimate thermal contact between heat transfer layers.

SUMMARY OF THE INVENTION

In one aspect, the invention provides a method of making a laminated device, comprising:
providing a bottom sheet, a top sheet and wherein there is a gap disposed between a surface of the top sheet and a surface of the bottom sheet [note that the top and bottom sheets can be part of subassemblies]; providing a thermally conductive fin insert having a height that is at least 1% greater (preferably at least 2% greater, and in some embodiments 1 to 10% greater) than the gap height, placing the fin insert in the gap; and pressing the sheets together such that the fin insert deforms to fit within the gap.

The insert may or may not have a catalyst coating. In some preferred embodiments, the resulting device has an irregular configuration in which the insert is deformed in an irregular fashion, for example, the crushed walls do not all bow in the same direction, nor in alternating directions. In some embodiments, the fins are primarily (greater than 50%, preferably greater than 80%) bowed in the same direction. The compressed fins do not have a regular shape such as is present in a corrugated sheet.

In some preferred embodiments, a surface of the bottom and/or top sheet has weld lines protruding from the surface; in some preferred embodiments, the sheet comprises one or more internal weld lines with a continuous length of at least 50% (preferably at least 80%) of the sheet's length or width; and at least one side of the fin insert rests at least partially (preferably fully) on the one or more weld lines. Preferably, the direction of flow through the insert is perpendicular to the weld lines. Surprisingly, we discovered that good thermal transport was obtained in the presence of these weld lines, even where the weld lines were interposed between a reaction chamber (i.e., the chamber containing the press-fit plus catalyst) and a heat exchanger. In some embodiments the fin insert is tack welded to the top or bottom surface, in a more preferred embodiment, the fin insert is held in place by press fit and is not joined to either surface by welding. Preferably, the fin is disposed within a microchannel, and/or an adjacent heat exchanger comprises microchannels.

As is the case with all the methods described herein, the invention also includes a device formed by the method. The invention also includes operation of the device formed by the method for conducting one or more unit operations. Preferably, the devices mentioned herein are chemical processors that are adapted for conducting one or more unit operations.

In another aspect, the invention provides a laminated device, comprising:
a device comprising a fluid inlet connected to a process chamber and a fluid outlet connected to the process chamber; wherein the process chamber comprises a gap and a thermally conductive fin insert that is disposed within the gap and touches the top and bottom of the gap; further wherein the fin insert has an irregular shape that is caused by an at least 1% compression of the fin insert within the gap; and a heat exchanger in thermal contact with the process chamber. In this device, the irregular shape is caused by compression of sheets on either side of the gap such that the height of the fin insert is deformed by at least 1% of fin height (where height is in the same direction as stack height), preferably at least 2% and in some embodiments at least 5% and in some embodiments in the range of 1 to 10%.

This device may contain any of the features mentioned herein. For example, in some preferred embodiments, the insert does not have a catalyst coating; in some preferred embodiments, catalyst particles are present in the gap. A conductive fin insert is a fin that moves the heat from the process occurring within the fin section to the adjacent heat exchange layers. The fin insert is preferably made from a material with a higher thermal conductivity than the material of construction of the heat transfer layer. In some preferred embodiments, the conductive fin insert has a thermal conductivity that is greater than 10 times and more preferably greater than 100 times the effective thermal conductivity of the catalyst disposed within the conductive fin structure. For most materials, thermal conductivity is known and, if not, can be measured using a standard ASTM method.

In a further aspect, the invention provides a method of conducting a chemical reaction, comprising: passing at least one reactant into the process chamber of the device of claim 2; conducting a process within the process chamber, and, simultaneously, exchanging heat between the process chamber and the heat exchanger.

In another aspect, the invention provides a method of making a laminated device, comprising: providing a first subassembly or a first sheet and a second subassembly or a second sheet; wherein the first subassembly or first sheet comprises a first parallel array of channels and wherein the second subassembly or second sheet comprises a second parallel array of channels and wherein there is no intersection between channels in the first subassembly or first sheet and the second subassembly or second sheet; welding an edge of the first assembly to an edge of the second assembly to form a combined subassembly layer or welding edges of the first and second sheets to form a welded single sheet; and stacking the combined layer or welded single sheet with one or more layers or sheets, and joining the stacked layers or sheets to form a laminated device.

Although there is no interchannel mixing of channels in the first and second sheets, the first and second arrays of parallel channels can share a common header and/or footer. In one example of this method, a sheet (or a subassembly comprising plural sheets) is cut into four pieces and the four pieces are welded back together along their edges—this is a counterintuitive process since we are cutting a sheet and rejoining it along edges that were previously cut. Nonetheless, this process has been found to significantly reduce warpage and thus result in a superior laminated article. In some broader aspects of this method, the first and second sheets (or subassemblies) are not cut from a common piece, but rather can be separately obtained. Preferably, the stacked layers are of equal width and length (in some embodiments within 5% of length and width; in some embodiments within 1% of length and width). The cuts (and rejoining welds) should be parallel to channel length; in this orientation, there is no risk to form blocked or discontinuous channels.

In some preferred embodiments, the aspect ratio of the first subassembly in width:height and length:height is greater than 2, more preferably greater than 10. In some preferred embodiments, the aspect ratio of the first sheet or first subassembly in width:length or length:width is 1.5 or more, more preferably 2 or more, in some embodiments 4 or more. Height refers to stacking height, with width and length being mutually perpendicular and length being in the direction of fluid flow along the sheet. Preferably, the first subassembly or a first sheet comprises at least 5 first parallel channels (preferably microchannels); and the second subassembly or a second sheet comprises at least 5 second parallel channels (preferably microchannels), and the first and second subassemblies or sheets are joined along an edge to result in a sheet or subassembly in with the first parallel channels are parallel to the second parallel channels; and, preferably, a single manifold serves both the first and second parallel channels. Preferably, the first and second subassemblies or sheets are joined such that adjacent parallel channels in the first and second assemblies or sheets are within 2 cm, more preferably within 1 cm. in the width direction (length is parallel to the net direction of flow through the device). The resulting device will contain sheets that have welding seems that connect segments of the sheet. In some preferred embodiments, especially those in which the aspect ratio of the first sheet or first subassembly in width:height or length:height is greater than 1, a step of flattening one or more (and preferably all of) the subassemblies is conducted prior to welding the edges together.

As with all the methods described herein, the invention includes the article that results from this method.

The invention includes a laminated device comprising: a first layer having dimensions of length and width; wherein the first layer comprises a first section comprising a first plurality of parallel channels, and a second section comprising a second plurality of parallel channels, wherein the first and second pluralities of channels are parallel; wherein the first and second sections are joined together by a joint and wherein the joint is parallel to the parallel channels; and a second layer, wherein the second layer is welded onto the first layer. In some preferred embodiments, the first layer is a subassembly and the second layer is a subassembly, and the layers are joined by a weld along the perimeter of the layers.

In a further aspect, the invention provides a method of precambering to make a flatter subassembly. This method of making a laminated device, comprises providing a metal sheet; deforming the metal sheet; and bonding the deformed metal sheet into a laminated device.

In a preferred embodiment, the metal sheet is deformed in an arc with a curvature of at least 10 degrees from flat, in some embodiments a curvature in the range of 10 to 80 degrees from flat. Parts are preferably precambered from a flat state to build in deformation such that when the stress of welding (especially laser welding) is added to the parts, they return to a near flat state. The arc of curvature from a flat state is less than 90 degrees, and preferably between 10 and 80 degrees. A more preferred range is from 30 to 70 degrees. In some preferred embodiments, the metal sheet is stainless steel.

In another aspect, the invention provides a method of making a laminated device, comprising: providing a subassembly; flattening the subassembly; welding the subassembly to a sheet or second subassembly. Preferably, the subassemblies are welded along their perimeters except where there are openings for inlets or outlets. In some preferred embodiments, this method is combined with any of the methods described herein.

In another aspect, the invention provides a method of conducting a process in a channel layer that changes from tension to compression or vice versa, comprising providing a device comprising a first channel layer, and a second channel layer directly adjacent to the first channel; wherein, at a first time, the first channel layer comprises a first fluid at a first pressure and the second channel layer comprises a second fluid at a second pressure; wherein the first pressure is greater than the second pressure; conducting a unit operation in the first channel layer at the first time; wherein, at a second time, the first channel layer comprises a third fluid at a third pressure and the second channel layer comprises a fourth fluid at a fourth pressure; wherein the fourth pressure is greater than the third pressure; conducting a unit operation in the first channel layer at the second time.

In tension, pressure in the first channel layer is greater than in the second channel layer and in compression, pressure in the first channel layer is less than in the second channel layer. In the height direction, a layer is defined by a floor and a roof and the tension or compressive force is exerted on the floor or roof of the layer. In some preferred embodiments, the first and third fluids are the same and the second and fourth fluids are the same; for example, the first and third fluids may be a Fischer-Tropsch ("FT") process stream and the second and fourth fluids are a heat exchange fluid, typically water (or other heat exchange fluid) that is undergoing partial boiling. Examples of other processes may include syntheses of ethylene oxide, propylene oxide, methanol, ammonia, styrene and hydrogenations and hydrotreating. Preferably, the method is conducted in a laminated device with the first channel disposed in a first layer and the second channel disposed in an adjacent layer. More preferably, the process is conducted within a laminated device comprising numerous (such as at least 10) alternating layers of first and second channels. In some preferred embodiments, the first channel comprises a press-fit insert, and in some preferred embodiments the first channel comprises a catalyst, which is preferably used in conjunction with the press-fit insert. We surprisingly discovered that a device made without diffusion bonding or brazing (such as a press fit device) can operate successfully under these conditions. Preferably, this method is defined as occurring during continuous operation, rather than occurring during shut down or start up. The process may occur, for example, as solids build up in a process channel, and/or as catalyst loses activity and process conditions are adjusted to accommodate changes within the reactor.

In a further aspect, the invention provides devices in which a halo (described below) connects sections of a device. Thus, the invention provides a device comprising a first laminated assembly comprising a plurality of stacked sheets; wherein a first side of the first laminated assembly comprises a plurality of inlets or outlets; wherein an enclosure is joined to the first side and extends out from the first side, and encloses the plurality of inlets and outlets. Typically, the enclosure is metal and is welded onto the first side of the first laminated assembly.

In some preferred embodiments, the device includes a second laminated assembly comprising a plurality of stacked sheets; wherein a first side of the second laminated assembly comprises a second plurality of inlets or outlets; and wherein the enclosure connects the first plurality of inlets or outlets to the second plurality of inlets or outlets.

In another aspect, a laminated microchannel device having a length and a width, wherein the cross section defined by the sheet length multiplied by the sheet width is greater than 100 cm2 (in some embodiments greater than 500 cm$^2$) and, is joined with a top plate to form a welded assembly with a linear density of laser welded joint of between 0.05 to 20 cm/cm$^2$ (preferably 0.1 to 10 cm/cm2) over a section of a surface of a sheet within the microchannel device; this section comprises at least 50% (preferably at least 90%, in some embodiments 100%) of contiguous area of a major surface (sheets have two major surfaces). In most cases, the sheet forms a surface of a subassembly within a larger device. The welds hold together two or more sheets. The welds may also provide for sealing between two adjacent interior flow channels. In this device, "100% of contiguous area" means the entire surface (not just 100% of a selected rectangular area; likewise 50% and 90% means 50% and 90% of the entire surface. Preferably, the sheet length to width ratio is greater than 2. In addition to, or as an alternative to the stated linear density, the inventive device can be defined as having internal welding (i.e., welds on the interior of a sheet rather than the perimeter) that is at least 10 times greater, preferably at least 100 times greater, than the circumference (perimeter) of the device.

In another aspect, the invention provides a laminated microchannel assembly comprising a first sheet and a second sheet; wherein each sheet has a length and a width, wherein the cross section defined by the sheet length multiplied by the sheet width is greater than 100 cm2 (in some embodiments greater than 500 cm2); wherein the first and second sheets are substantially flat (the sheets may have some warpage, but the sheets are not corrugated); wherein the first sheet comprises an array of parallel microchannels, wherein the microchannels are separated from each other by a barrier wall (the microchannels may be partially through the thickness of the first sheet (e.g. etched channels) or may be through the entire thickness of the first sheet); wherein the first sheet and the second sheet are adjacent; and comprising welds that run along the length of the barrier walls (the welds can be continuous or discontinuous) and join the first sheet to the second sheet.

The phrase "run along" means that the welds run in the same direction as the barrier walls and contacts the barrier walls.

In any of the methods describes herein, an assembly can be formed by joining two or more welded subassemblies, wherein the method of welding two or more subassemblies to form an assembly may be the same welding method or a different welding method. In some embodiments, welded subassemblies can also contain joints formed by techniques other than welding.

In a further aspect, the invention provides a method of forming an assembly comprising welding a top sheet to a bottom sheet to form a plurality of channels disposed between a top surface of the top sheet and a bottom surface of the bottom sheet wherein welding is used to form seals between the channels in the plurality of channels. The top and bottom surfaces are the top and bottom surfaces of the laminated assembly. For example, the bottom sheet could contain etched channels and the top sheet could be a non-etched flat sheet. Preferably, the method of joining sheets into assemblies comprises laser welding to seal between two adjacent interior flow channels. In any of the embodiments described herein, channels may preferably be microchannels.

In another aspect, the invention provides a welded substrate assembly that has been undergone a repair process for sealing leaks or holes in the primary welding step, wherein the repair process may comprise the same weld methodology as the primary welding (typically laser welding) or may utilize a secondary process such as TIG welding, pulsed laser, CMT or other to reduce the number of leak points in a welded substrate assembly.

In a further aspect the invention provides a welded substrate assembly that may hold a differential pressure of more than 100 psig at ambient temperature (more preferably more than 500 psig, and still more preferably more than 800 psig at ambient temperature). The welded assembly is a laminated device in which, during operation, flow of fluids is primarily perpendicular to sheet thickness. In the welded assembly, the seals for maintaining the differential pressure are not diffusion bonded or brazed.

In another aspect, the invention provides a method of forming a laminated, welded device comprising: obtaining a welded substrate assembly that has a curvature of greater than 1 cm when sitting on a level table; subjecting the welded substrate assembly to a flattening process to create a substantially flat part with no more than 1 cm rise above flat when sitting on a level table; and welding the flattened substrate assembly to a subassembly to form the laminated, welded device.

In a further aspect, the invention provides a welded substrate assembly comprising a plurality of channels that are sealed by welding (the sealing is not the result of polymeric gaskets, brazing, diffusion bonding, or other conventional techniques) and having a leak rate less than about 0.5 psig per 15 minutes; or a leak rate less than 10 sccm nitrogen (preferably less than 1 sccm nitrogen) when pressurized in nitrogen at 100 psig and ambient temperature.

In a further aspect, the invention provides a pressure-resistant laminated device comprising: a stack of sheets that are joined together (preferably by welding); wherein the stack of sheets comprise a plurality of channels within the stack, and at least one inlet and one outlet connected to the plurality of channels; a continuous unattached span that constitutes a void within the stack of sheets; first and second endplates on opposing sides of the laminated device; and further comprising an array of stiffening members which are held (for example, via welding) in intimate contact with the major exterior faces of the endplates, and extending continuously across a region aligned with the continuous unattached span. The stiffness of the members of the array is such that they resist bending in the stacking direction (i.e. the direction orthogonal to the plane of the laminae). Preferably, the system further comprises a process stream comprising hydrogen and/or a hydrocarbon passing through the plurality of channels.

The invention also provides for the repair of welded devices. The devices can be refurbished by removing one or more welds. By removing a plate at one end of channels, selected channels can be plugged—thus reducing hot spots or otherwise avoiding channels that have developed defects. Alternatively, a device can be opened up by removing a perimeter weld, and then subassemblies may be removed or replaced. In some embodiments, a subassembly can be removed and refurbished prior to being reinserted into a device. After removing and/or replacing a subassembly, welding can again be used to close the device. To assist in disassembly, one or more surfaces of a subassembly can be coated with a release layer such as a coating of zirconia or yttria, or insertion of grafoil or ceramic paper between subassemblies.

The invention also includes methods of maintaining a reactor by opening a weld and removing or replacing: catalyst (such as particulate catalyst), a fin or waveform, or a subassembly. The device may then be welded back together. The invention further includes devices having weld structures resulting from the maintenance or repair.

In a further aspect, the invention provides a laminated chemical processor, comprising: a plurality of sheets in a stack; the stack having mutally perpendicular dimensions of height, width, and length; wherein height is the stacking dimension; for an open space within the stack, length is the longest dimension and width is perpendicular to length; wherein the stack comprises at least one interface between sheets wherein, during operation, an internal pressure is applied in an open space within the stack and at the interface, wherein the open space has width of at least 0.07 m; and possessing leak resistance such that: when N2 gas is supplied through an inlet into the void space at said interface, and wherein an outlet is closed so that pressure increases at a rate of 30 to 50 kPa/min and pressure in the void space is increased to 790 kPa and held at that pressure for 15 minutes, then returned to ambient pressure by releasing the N2 gas, and then supplying water at a rate sufficient to raise the pressure through the inlet at a rate of 300 to 400 kPa/min, and wherein the outlet is closed so that pressure increases and pressure in the void space is increased to about 3000 kPa and then continuing to increase pressure at a rate of about 100 kPa/min to 6000 kPa, and then dropping the pressure at a rate of 250 to 300 kPa to below 5300 kPa and then continuing to drop pressure to ambient pressure and draining the water and drying the processor, and again supplying N2 gas through the inlet at a rate so that pressure increases at a rate of 30 to 50 kPa/min into the void space at said interface, and wherein the outlet is closed so that pressure increases and pressure in the void space is increased to 790 kPa and the inlet closed so that no more gas enters the void space, the device leaks less than 100 kPa over the following 15 minutes.

The invention includes processors possessing the claimed leak resistance; not merely processors that have undergone the testing protocol. More preferably the processor has a leak resistance of less than 30 kPa over the following 15 minutes, and in some embodiments in the range of 1 to 50 kPa. In some preferred embodiments, the open space has a width of at least 0.1 m, in some embodiments a width of at least 0.3 m. The processor can be any shape; and in some embodiments the processor is comprised of a stack of rectangular sheets while in some other embodiments, the processor is comprised of a stack of circular sheets.

Preferably, the processor does not have an endplate that has a thickness greater than 3 cm, preferably not greater than 1 cm, and in some embodiments not greater than 0.5 cm. Preferably, the processor has a width and a length of at least 0.3 m; in some embodiments at least 0.5 m. The invention includes any combination of features described throughout this description; for example, a processor having a width and a length of at least 0.3 m and which does not have an endplate that has a thickness greater than 3 cm. The interface can be planar but it not necessarily planar.

In some embodiments, the device comprises more than 0.1 km of internal linear weld, in some embodiments more than 1 km of internal linear welds and an exoskeleton. Preferably, the laminated chemical processor is held together by the exoskeleton and welds. Preferably, the laminated chemical processor is not diffusion bonded or brazed and does not have gaskets. Clamps are not needed to hold together the laminated chemical processor and due to its leak resistance (which is not due to clamps), the processor does not need to be within a pressure containment vessel. In some preferred embodiments, at least 60 vol % (in some embodiments at least 80 vol %) of the entire laminated chemical processor is composed of microchannels and other void space.

In the leak resistance test described above, the statement that the "outlet is closed" means that N2 is trapped within the void space except for leakage out through the interface between sheets. Further, it should be understood that this test applies to a single interface or the averaged sum of all interfaces served by the inlet. The device meets the test if at least one fluid circuit having the specified parameters meets the test, preferred devices have at least 2 fluid circuits that meet the test, more preferably, all fluid circuits meet the test (for example, if the device has two fluid circuits each served by one inlet and one outlet, both circuits meet the test). The device is at ambient pressure except for the areas of the device connected to said inlet.

The invention also includes a laminated chemical processor having an exoskeleton and having one or more (including any combination) of the features described herein. A continuous unattached span within an internal pressure boundary is the minimum distance between a given point of attachment between laminae within a given pressure-exposed interface in the laminated device to an adjacent point of attachment between those same laminae. In preferred embodiments the exoskeleton is welded to the device, while in other embodiments the exoskeleton is held by brazing, gluing, or other means.

The exoskeleton is superior to clamps. Clamps can be more easily removed (exoskeletons need to be removed by cutting or grinding). Furthermore, in an exoskeleton-welded reinforcement members can have a rectangular cross section oriented with the longer side parallel to the direction of load application to provide increased stiffness to resist bending stress. This permits the use of thinner shell plates and reduces the weight and cost of material required to support equal loads. Clamps having thick plates with threaded fasteners could be used in place of the exoskeleton; however, the plates would need to be strong enough for the bending stress since the threaded fasteners would not be loaded in this direction. The threaded fasteners would need to be strong enough for the full tension stress caused by the force created by the pressure acting on the plates. The exoskeleton provides additional support to the plates in both cases. Furthermore, clamps would be more likely to loosen and fail during repeated cycling.

The invention also includes a method of operating a laminated chemical processor, comprising: passing a gas into an inlet of the processor to increase pressure inside the processor to a first pressure; optionally detecting leaks and optionally repairing the leaks; releasing the gas; passing a fluid into the processor to increase pressure inside the processor to a second pressure, wherein the second pressure is higher than the first pressure; removing the fluid; passing a gas into an inlet of the processor to increase pressure inside the processor to a third pressure, wherein the second pressure is higher than the third pressure; and measuring leaks while the processor is held at the third pressure. In some preferred embodiments, the fluid is a liquid. This method is superior to a technique of a single step of loading a pressurized fluid into a device and testing for leaks.

In yet another aspect, the invention provides a laminated device comprising: a stack of sheets joined by welding; the stack of sheets comprising a core stack of sheets joined by welding along the perimeter of the sheets; and a strain relief joint within the stack of sheets; wherein the strain relief joint comprises two adjacent sheets that are held within the stack but are substantially not joined to each other along the perimeter of two adjacent sheets.

Throughout this disclosure, "adjacent" means directly adjacent with no intervening sheets.

The invention includes any method of using any of the apparatus described herein; for example, a chemical process using any of the apparatus described here. Likewise, the invention includes any apparatus for conducting any of the methods described in this application. The invention further includes any combination of the methods and/or structures mentioned herein. The sheets and inserts (if present) are preferably all comprise metal. In the finished devices, the metal can be coated with protective coatings and/or catalyst coatings such as a porous metal oxide layer having a catalyst metal dispersed on the metal oxide.

The invention is intended to include, in various alternatives, any of the broad concepts and/or specific features that are described herein and can be reasonably inferred by the person skilled in this technology. For example, the inventive apparatus can have any of the combination of features described herein.

The invention is not limited to the specifically concepts identified above, but includes any of the methods, systems, and apparatuses described herein. The invention includes any feature or any combination of the features mentioned herein. The invention also includes methods of chemical processing (including, for example, heat transfer, chemical reactions, the Fischer-Tropsch (FT) synthesis reaction and, for example, includes one or more (including any permutation) of the conditions, conversions, etc. that are mentioned herein. Where a process is described with reference to graphs or tables, the invention includes processes that have values within +/−20%, more preferably about 10%, more preferably about 5%, and in some embodiments within about 1% of the conditions, ranges, and/or values described herein. For example, the invention includes a method of FT synthesis operating with a contact time in the range of about 90 to about 278 ms with a CO conversion between about 58 and about 73% and a methane selectivity of between about 8 and about 34% (the term "about" would include values within +/−20%); the invention includes methods that are further defined by the device structures; the invention may alternatively be defined as a system which includes both apparatus features and fluid compositions and/or conditions—for example, a system could be apparatus containing hydrogen gas and carbon monoxide at a temperature above 180° C.

GLOSSARY

An "assembly" is two or more plates joined together to form a laminate. An assembly is typically made up of plural "subassemblies" and can be a functioning device or a precursor to a device. A "subassembly" is an "assembly" that is (or is intended to be) a component of a larger laminated assembly. In some preferred embodiments, an assembly is fully sealed except for inlets and outlets. An assembly is not required to be a fully functioning device; for example, it may be a precursor or intermediate product to a fully functioning device. For example, in some cases, a secondary trimming step is required to open inlet and outlet flow passageways. In some embodiments, an assembly is made up of plates having width and length dimensions of a finished device; in some other embodiments, assemblies can be cut into multiple subassemblies or, alternatively, joined to form a larger assembly. In some preferred embodiments, an assembly (or subassembly) has a thickness of 1 cm or less; in some preferred embodiments, a thickness of between 0.1 and 1.0 cm; in some embodiments a thickness of between 0.2 and 0.4 cm. It is preferred that plates within an assembly are substantially flat and that the assembly has flat top and bottom surfaces.

Throughout this disclosure, the terms "plate," "sheet," "laminae," and "shim" are used interchangeably. Plates have a thickness of 1 cm or less; preferably 0.5 cm or less; more preferably 0.3 cm or less; and typically have a thickness of at least 0.02 cm.

An "exoskeleton" is an array of stiffening members which are held (for example, via welding) in intimate contact with the major exterior faces of the endplates of a laminated chemical processor, and extend continuously along the endplate which intervenes between an internal pressure boundary and external pressure boundary of the array of stiffening members. The stiffness of the members of the array is such that they resist bending in the stacking direction (i.e. the direction orthogonal to the plane of the laminae). An exoskeleton is not a clamp and does not require screws or bolts.

A "gap" is the smallest dimension of a microchannel. Typically, in a laminated device, the gap is in the stacking direction (i.e., the height). Where the term "gap" is used, preferred embodiments can be described instead as the height of a microchannel.

A "microchannel" is a channel having at least one internal dimension (wall-to-wall, not counting catalyst) of 10 mm or less, preferably 2 mm or less, and greater than 1 µm (preferably greater than 10 µm), and in some embodiments 50 to 1500 µm, with 500 to 1500 microns especially preferred when used with a particulate form of catalyst; preferably a microchannel remains within these dimensions for a length of at least 1 cm, preferably at least 20 cm. In some embodiments, in the range of 5 to 100 cm in length, and in some embodiments in the range of 10 to 60 cm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. In the case of a laminated device where a microchannel has two major surfaces (for example, surfaces formed by stacked and bonded sheets), the height is the distance from major surface to major surface and width is perpendicular to height. In some preferred embodiments of this invention, microchannels are straight or substantially straight—meaning that a straight unobstructed line can be drawn through the microchannel ("unobstructed" means prior to inserting solid catalysts, sorbents, or other separate solid materials). Typically, devices comprise multiple microchannels that share a common header and a common footer. Although some devices have a single header and single footer; a microchannel device can have multiple headers and multiple footers. Microchannels are also defined by the presence of at least one inlet that is distinct from at least one outlet—microchannels are not merely channels through zeolites or mesoporous materials. The height and/or width of a reaction microchannel is preferably about 2 mm or less, and more preferably 1 mm or less. The sides of a microchannel are defined by reaction channel walls. These walls are preferably made of a hard material such as stainless steel, or a Ni-, Co- or Fe-based superalloy such as FeCrAlY. The process layers may comprise a dissimilar material from the heat exchange channels, and in one preferred embodiment the process layers comprise copper, aluminum or other material with a thermal conductivity greater than 30 W/m-K. The choice of material for the walls of the reaction channel may depend on the reaction for which the reactor is intended. In some embodiments, the reaction chamber walls are comprised of a stainless steel or Inconel® which is durable and has good thermal conductivity. Typically, reaction channel walls are formed of the material that provides the primary structural support for the microchannel apparatus. Microchannel apparatus can be made by known methods, and in some preferred embodiments are made by laminating interleaved plates (also known as "shims"), and preferably where shims designed for reaction channels are interleaved with shims designed for heat exchange. Some microchannel apparatus includes at least 10 layers (or at least 100 layers) laminated in a device, where each of these layers contain at least 10 channels (or at least 100 channels); the device may contain other layers with fewer channels.

In some apparatus, process channels contain catalyst particles. Preferably, the particles have a size (largest dimension) of 5 mm or less, in some embodiments, 2 mm or less. Particle size can be measured by sieves or microscopy or other appropriate techniques. For relatively larger particles, sieving is used. Particulate materials included in process channels may be catalyst, adsorbent, or inert material.

Heat exchange fluids may flow through heat transfer channels (preferably microchannels) adjacent to process channels (preferably reaction microchannels), and can be gases or liquids and may include steam, liquid metals, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. In some preferred embodiments, when there are "n" layers of process microchannels then there are "n+1" layers of heat exchange layers whereby the heat exchange layers flank all process layers. Each of these layers may contain simple, straight channels or channels within a layer may have more complex geometries. The invention includes systems that are comprised of both apparatus and fluids present in the apparatus. In "Bonding," a heating process is used for joining pieces in which there is diffusion of elements from one piece to another resulting in a joined article with diffused elements near the interface (or near what used to be the interface before bonding).

Brazing uses an interlayer sandwiched between parts, the interlayer has a lower melting point than the parts.

Welding uses heat to join or seal parts. Unlike brazing, welding does not require a lower melting material, although it is recognized that a weld may use a weld wire of the same material or similar material which may have a slightly lower melting temperature, but a joint is also referred to as a welded joint where the seal is at the periphery of a laminated device, with some weld penetration depth at the periphery rather than throughout the article. A "weld" in a finished piece can be identified by the skilled worker—for example, a metallurgist can identify a weld by microscopic inspection or other techniques known in the art.

"Joining" includes welding, bonding, adhesives, brazing. Joining is any process that binds two or more pieces together.

A "substrate assembly" is composed of a plurality of sheets that are attached to each other to form a cohesive, laminated stack. A "substrate assembly" is sometimes termed a panel, and may be comprised of top and bottom sheets defining a flow path, and, more typically comprises numerous sheets in a stack defining numerous flow paths.

The invention also includes methods of conducting unit operations within the apparatus described herein. "Unit operation" means chemical reaction, vaporization, compression, chemical separation, distillation, condensation, mixing, heating, or cooling. A "unit operation" does not mean merely fluid transport, although transport frequently occurs along with unit operations. In some preferred embodiments, a unit operation is not merely mixing.

Microchannel reactors are characterized by the presence of at least one reaction channel having at least one dimension (wall-to-wall, not counting catalyst) of 1.0 cm or less, preferably 2 mm or less (in some embodiments about 1 mm or less) and greater than 100 nm (preferably greater than 1 µm), and in some embodiments 50 to 500 µm. A channel containing a catalyst is a reaction channel. More generally, a reaction channel is a channel in which a reaction occurs. The length of a reaction channel is typically longer. Preferably, the length of a reaction channel is greater than 1 cm, in some embodiments greater than 50 cm, in some embodiments greater than 20 cm, and in some embodiments in the range of 1 to 100 cm.

"Press-fit" describes the manner in which a fin (preferably a copper waveform) is disposed within a space within the apparatus. A press-fit fin is held in place by being compressed or snug within a void within a device or subassembly. Although a small amount of tack welding can be present; a press-fit fin is not brazed or welded at all contact points into position. Preferably, a press fit fin is not held in position by any adhesive or any such chemical bonding.

Open Space—refers to a space within the processor in which there are no bonded internal supports that resist tension. The open space may contain ribs or other structures that provide support in compression, but these structures are not bonded on both sides of the interface and thus do not resist tension. An "open space" may be present as part of a larger space; however, in preferred embodiments, the laminated device is welded or otherwise joined only on the periphery.

Void space is space within a device that is accessible to N2 gas passed into one or more inlets of the device. The volume of void space can be measured by evacuating the space for at least 10 seconds and then passing N2 gas into the space and measuring the quantity of N2 gas filling the space.

Internal linear weld—welds that join two or more laminates together within the perimeter of an externally perimeter welded device.

As is standard patent terminology, "comprising" means "including" and neither of these terms exclude the presence of additional or plural components. For example, where a device comprises a lamina, a sheet, etc., it should be understood that the inventive device may include multiple laminae, sheets, etc. In alternative embodiments, the term "comprising" can be replaced by the more restrictive phrases "consisting essentially of" or "consisting of.

DESCRIPTION OF THE INVENTION

Figure 1:
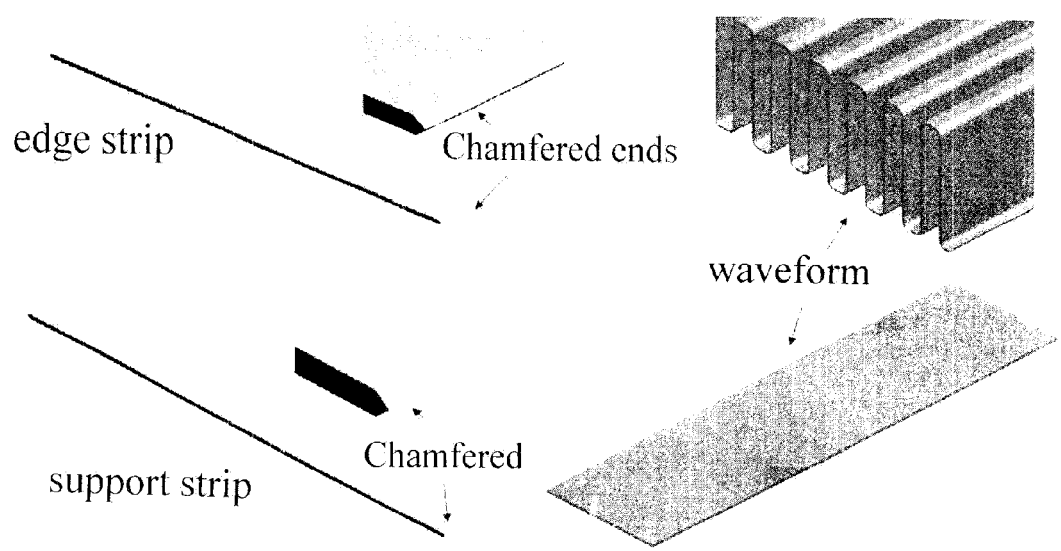
FIG. 1 illustrates some elements from which a process layer can be assembled.

The described invention provides methods of making devices, and devices which can be made by the methods. The invention further includes methods of conducting unit operations in the devices. The unit operations may include chemical reactions, phase change, mixing, heat transfer, and separations. The devices may be microchannel or they may be used for devices with larger characteristic dimensions. The characteristic microchannel dimension is defined as 10 mm or less, with a range from about 0.001 mm to 10 mm, with a preferred range of 0.01 mm to 2 mm, and in some embodiments from 0.1 to 2 mm.

In some embodiments, a method includes a first step of forming a subassembly from at least two sheets, a bottom sheet and a top sheet (the bottom sheet may contain etched channels—alternatively, a sheet with through channels may be disposed between top and bottom sheets. In some embodiments, the subassembly may be made from three or more sheets. There may be small leaks but a fluid traversing through the first subassembly substantially stays within the first subassembly. In a second step, the first subassembly is stacked adjacent to a process layer and the subassembly and process layer are press fit into thermal contact to form an assembly that includes at least two or more fluid passageways.

One method of joining a subassembly creates a short stack of layers that comprises two or more layers to create fluid passageways. In alternate embodiments, more than two layers may be joined to create an array of parallel fluid passageways or a subassembly that enables fluid passageways for two or more fluids.

As an example of one embodiment for forming a first subassembly, a shim or laminae containing preformed channels (the channels may be formed by etching) is joined with a top plate. The edges of the subassembly are substantially hermetically sealed along the edges to prevent a fluid from leaking out the sides and maintaining the continuity of flow passage such that more than 95% and preferably 99% and more preferably still 99.9% of fluid that enters from a first inlet leaves the subassembly from a first outlet, rather than leaking out through the sides or other pathways where flow is not intended. In alternate embodiments, there may be more than one inlet and/or outlet that is defined by the laminate geometry.

The laminates are preferably also sealed along the top and or bottom face of the subassembly along corridors of continuous metal or material; in some preferred embodiments, at least 50% of corridors have continuous seals in the length direction on at least the top and/or bottom face; typically, the seals are along channel walls that separate channels. The joining may only occur in regions where when stacked in a subassembly, metal is in contact between the layers. It is understood that regions comprising a flow channel or a void for fluids to traverse after the device is manufactured would not be closed. It takes two materials in contact to form a seal. It is also understood that the joining of the subassembly along one or more faces of the subassembly may be continuous along the flow path or intermittent as required by the structural operating requirements of a device. Fluid may leak or traverse from one parallel channel to the next within a first subassembly when tested as an operational device or during quality control checks prior to operation. This small amount of transverse flow is less than 20% of the per channel flow and more preferably less than 10%, and still more preferably 2% or less; these percentages can be based on traverse flow averages over all channels, or traverse flow from any selected channel.

The joining of a subassembly comprises at least two layers, but could include three, or more layers. In one embodiment, twenty or more layers are joined in a subassembly. Methods for joining a first subassembly include but are not limited to laser welding, resistance welding, friction stir welding, ultrasonic welding, diffusion bonding, brazing or diffusion brazing or transient liquid phase brazing, adhesive joining, reactive joining, mechanical joining, and the like. The use of laser welding is a preferred embodiment, with specific types of laser welding (including fiber lasers and Yb fiber lasers in particular because of their low energy input which limits the amount of metal distortion after joining).

The method for joining the face of the subassembly may be the same or different than the method for sealing the edges of the subassembly. In one embodiment a fiber laser is used to seal along the perimeter and in another embodiment a pulsed laser is used. Other welding or joining methods may be used as well to seal along the perimeter (except for regions where flow passageways enter or exit a layer).

The joined or sealed subassembly is preferably checked for quality ("QC'd") prior to stacking into an assembly. Every subassembly may be evaluated or a statistical sampling of subassemblies may be QC'd or a random sampling of subassemblies may be evaluated for quality. A quality check may include a pressure test to check for leaks, a flow test to check for pressure drop or a dye test to check for residence time distribution which may be suggestive of flow between otherwise intended sealed interior parallel channels.

The joined or sealed subassemblies may then be joined into an assembly by interleaving or interspersing joined subassemblies with a second subassembly or a second array of fluid passageways to create a device with two or more sets of fluid passageways.

A fluid passageway may include a waveform or fin structure or alternate structure useful for chemical processing such as foams, felts, wads, cellular structures such as aerogels, honeycombs, and the like. In some preferred embodiments, the waveform or fin structure creates channels or chambers that have an aspect ratio (height to width) greater than one, where the height is the distance between two subassemblies and width is the distance between repeating fins or adjacent legs (wave surfaces) of the waveform. In an alternate embodiment, the second fluid passageway may contain any thermally conductive structure.

In a preferred embodiment the second fluid passageway are process channels and the first subassembly comprises heat transfer channels, although in some embodiments this functionality may be reversed.

An example of elements that can be used to construct a process fluid passageway is shown in FIG. 1, where a waveform is created from planar foils. The exterior of the fluid passageway is sealed with the use of edge strips (also defined as perimeter strips or p-strips) or side bars and may also include the use of support strips (s-strips).

Figure 2:
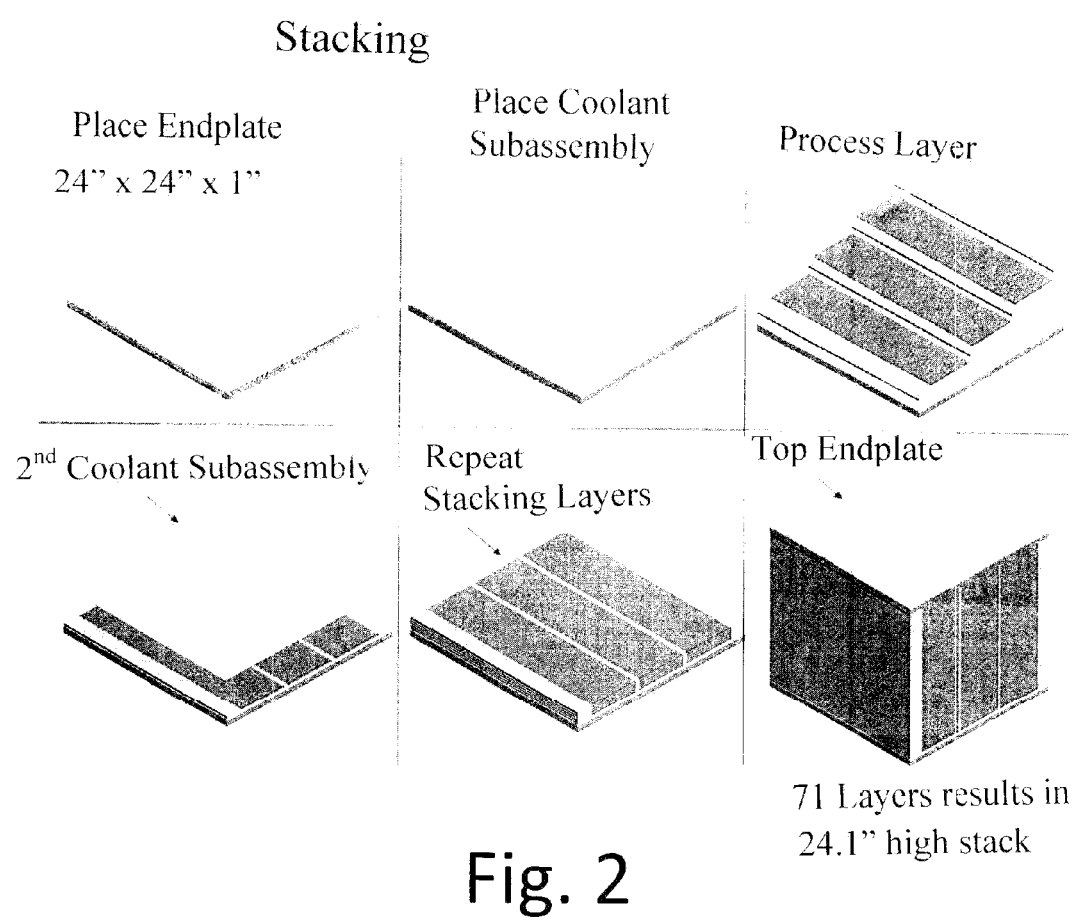
FIG. 2 shows stacking of components to form subassemblies and stacked subassemblies. Each illustrated process layer contains 3 fin inserts.
Figure 3:
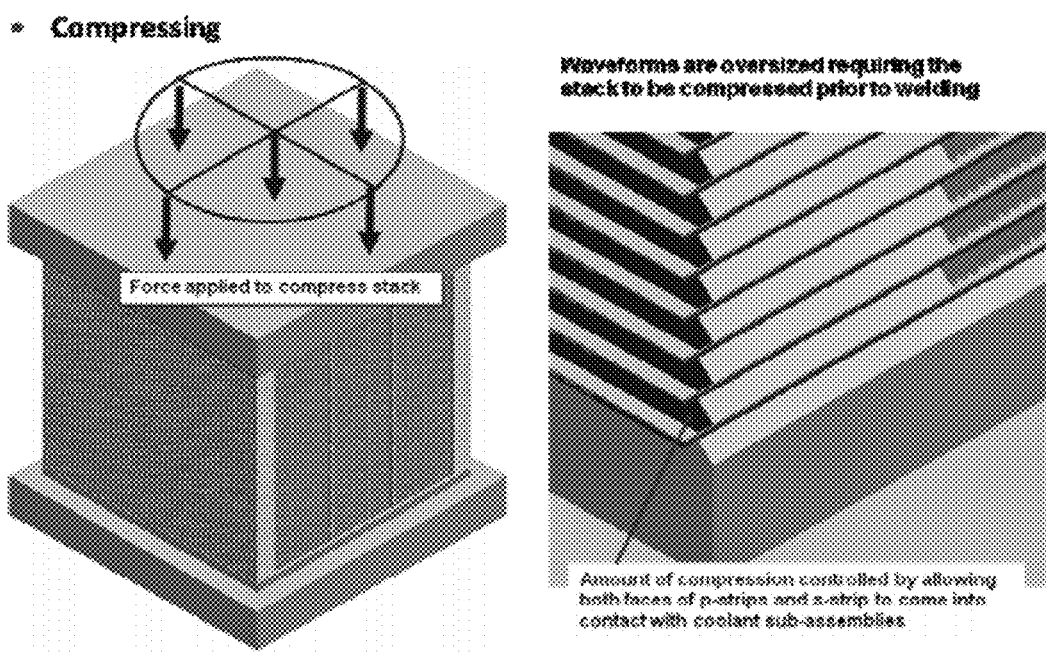
FIG. 3 shows laminated stack in compression and a view of the corner of the device.
Figure 4A:
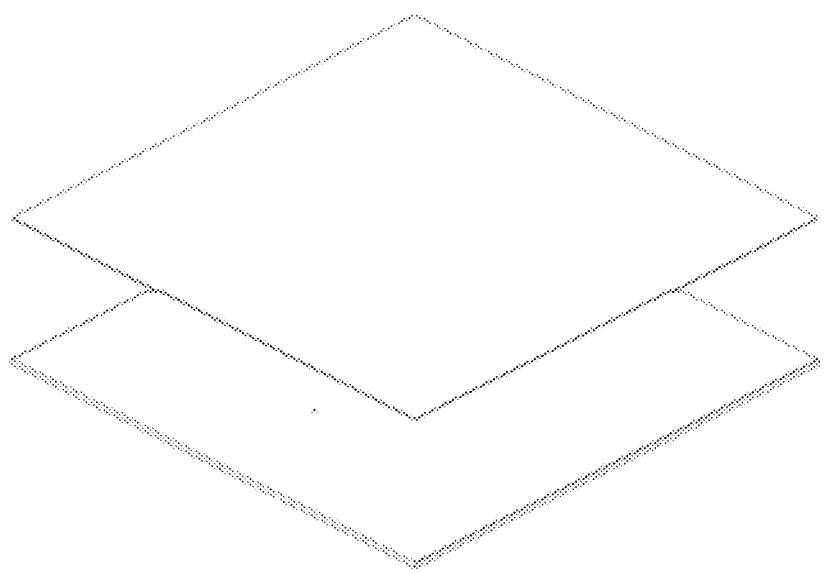
FIG. 4A illustrates two plates forming a strain relief joint
Figure 4B:
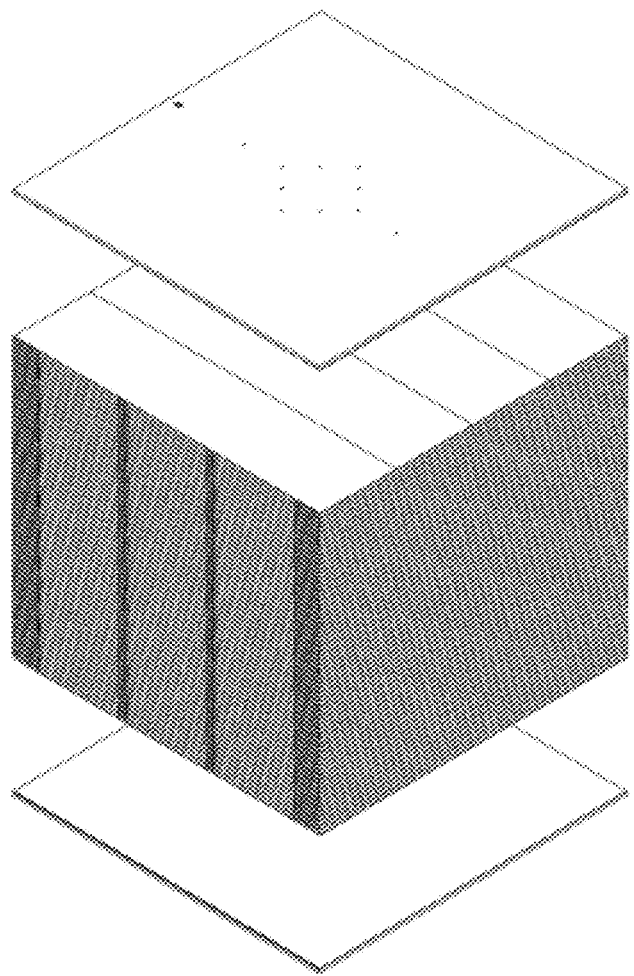
FIG. 4B illustrates expansion joint assemblies welded to the top and bottom of a reactor core.
Figure 5:
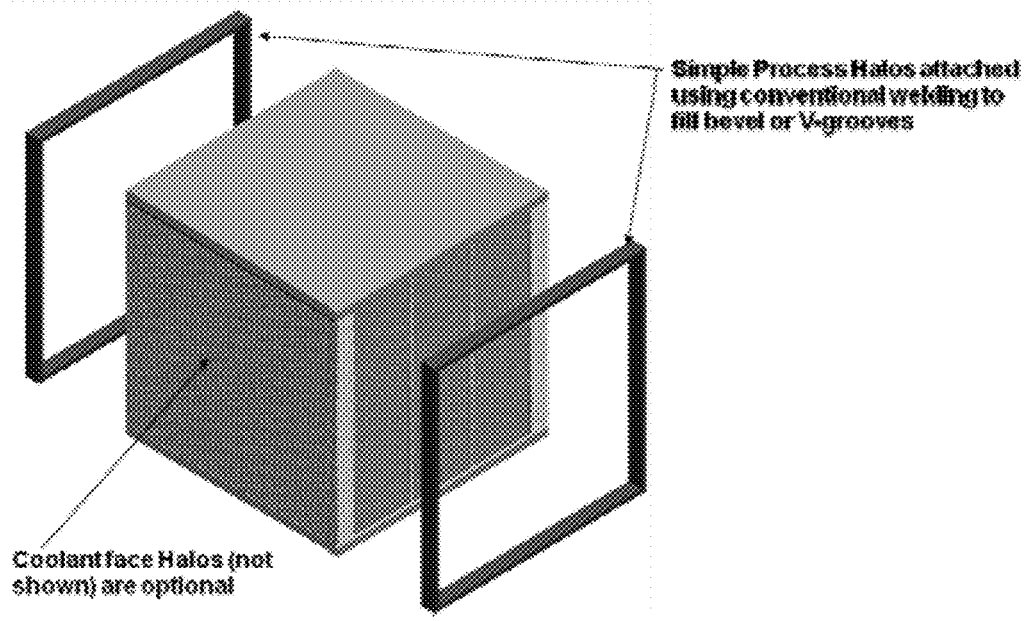
FIG. 5 illustrates "halos" to be placed on the exterior of a laminated device.

The first subassembly is placed or stacked between a layer of the second fluid passageway (shown as a waveform layer). This is shown in FIG. 2. There may be a single contiguous second fluid passageway or multiple contiguous fluid passageways (three shown in the FIG. 2) stacked at each layer for the second fluid passageway.

A process waveform may be joined to the first subassembly with the use of welding along apex of the fins or with thermally connected adhesives or other materials that enhance the thermal conductivity of the contact between the first subassembly and the second fluid passageway. In one embodiment, the two layers are pressed into each other during stacking and welding with no additional material added to enhance the thermal connection (this embodiment, with no brazing or weld joining parts, is termed "press-fit"). In another embodiment, additional material is added to reduce the contact resistance between the first subassembly and the second fluid passageway. In another embodiment, the thermal contact during chemical processing is enhanced by the use of a multiphase process, where the small clearance or gaps between the press fit process structure and the subassemblies are filled with a liquid during processing via capillary forces. The liquid may preferentially fill the gaps and enhance the conductivity of the composite structure when operated as a chemical processing unit.

After stacking the hybrid stack which includes both a first subassembly and a second fluid passageway, the inventive device is joined to form a stack by a method such as, but not limited to, exterior welding, adhesives, and reaction joining. The stack welding may use different types of welding methods, comprising TIG, MIG, laser welding, electron beam welding, among others. The exterior welding is preferentially automated for reproducibility and cost reduction. Soldering could also be an option for joining the perimeter if the service temperature and pressure of the chemical processor were sufficiently mild as to be conducive with solder.

Prior to joining the final assembly, the stack may be compressed to bring the layers into contact and reduce the voids between layers where the final device joining will occur. Compression may occur, for example, with the use of a clamped fixture applying a load with a bolt assembly or through the use of an external press to apply a load to the stack. The press-fit waveform may deform during compression, and may remain deformed after the compression is removed.

Subassemblies may require flattening prior to stacking. One method of flattening includes roll flattening of a laser welded subassembly using a leveling machine. This method reduced the deformation when used with 6"×24" (15 cm×60 cm) panels. These panels had a one dimensional deformation—along the length of the weld lines. Roll flattening was less successful with a 24"×24" (60 cm×60 cm) subassembly, where the part had deformation in two directions (a bowl shape or three dimensional parabolic-like shape). A conventional leveling machine was used to flatten the distorted part, but it resulted in breaking the laser welds. An unconventional and gentle hand roller was used to less aggressively bend the distorted part to a more flat state. The unconventional hand roller resulted in some reduction in deformation but did not reduce the part to a substantially flat state, wherein substantially flat is defined by the part sitting up no more than 1 cm at any corner when laying on a flat surface. Thus, gentle flattening may produce a superior device, especially for subassemblies that have differing width and length (i.e., non-square subassemblies). In some preferred embodiments, flattening is conducted on subassemblies having widths of about 15 cm or less; in some embodiments about 10 to 20 cm widths.

V-grooves are advantages between subassemblies since weld fillets can be applied to fill the V-grooves. The subassembly may protrude out slightly from the side bars or edge strip region. In an alternative embodiment, the subassembly is substantially flush with the edge strip. Substantially flush means within 5 or less increments of subassembly thickness. As an example, if a subassembly were 0.01" (0.025 cm) thick then the edge of the subassembly would neither protrude nor be recessed more than 0.05" (0.125 cm) from the edge of the edge strip. For a 0.06" (0.15 cm) subassembly, the offset from a flush edge is no more than about 0.3" (0.75 cm) with a preferred degree of offset no more than 0.06" (0.15 cm) from even, e.g. either protruding 0.06" (0.15 cm) or recessed 0.06" (0.15 cm) as a preferred embodiment.

A key advantage of this hybrid method of manufacturing is to reduce the surface preparation requirements for diffusion bonding and or brazing. Surfaces must be very clean, flat, and with tight tolerances for close fit up for a quality diffusion bond and or braze. Elimination of the brazing and or bonding step also eliminates the need to take the large device to a high temperature as required for diffusion bonding and or brazing. The energy required to heat and cool a large device is significant, as is the time required to heat and cool a large device to bonding or brazing time without incurring undue mechanical thermal strain and resulting deformation. For a device made from stainless steel composed of primarily planar interior laminae, an internal thermal gradient from the outermost corner to the center point should be less than about 30° C. above 500° C. to prevent mechanical deformation of the layer. For a device with a cross section greater than 0.5 m×0.5 m, it may take several days to heat and several days to cool the device when brazed or bonded in a vacuum-based thermal process. The required processing time and surface preparation of parts increases the overall cost of a reactor.

The inventive method for device manufacturing avoids the need for a diffusion bond and or braze step of a reactor. The inventive method can result in a reactor manufactured with a higher quality for a lower cost and in less time.

A surprising result from the inventive press fit device is the effect of contact resistance between the layers. The press fit of layers does not insure intimate thermal contact, which is further exacerbated as the size of the device increases and the starting part flatness is less than perfect. Heat is moved between the first subassembly and the second fluid passageway through a lower quality contact region separating the fluid streams. In a diffusion bonded or brazed device, each layer is in intimate thermal contact by the very nature of bonding and or brazing, whereas local surface roughness and or part irregularities or initial deformation will reduce the efficiency of heat transfer between the layers.

The importance of the thermal contact between the layers will depend upon the process operating requirements for the reactor or device. In some embodiments, the interior voids between the two layers will be filled in by the process fluids during operation. In another embodiment, a thermally connecting material such as an adhesive or putty or liquid or deformable solid such as a graphite or comparable interlayer may be introduced into the press-fit layer to reduce the contact resistance between the two fluid layers (at least one of which is a press-fit layer).

In some embodiments, no intervening thermal contacting layer is required. The Fischer Tropsch reaction was tested in an inventive reactor without the use of an intervening layer to enhance thermal contact between a process side waveform and a coolant side laser welded subassembly. The performance substantially matched that measured from an all brazed reactor of similar design.

It is also envisioned that reactions or unit operations involving either hydrogen and or a liquid, including but not limited to hydrogenation, hydrocracking, or hydroprocessing reactions, would not require an intervening thermally conductive layer between the first subassembly and the second fluid passageway. These fluids have good thermal conductivity and if these fluids fill the voids, good thermal conductance can be obtained. The liquids will all have a sufficient capillary pull to wick into the voids between the fin and the adjacent heat transfer surface. Further, it is noted that the surface tension of oils is substantially lower on copper than stainless steel, which further enhances the capillary pull of an oil or wax in the case of a Fischer Tropsch reactor, into the voids between the copper and stainless (or other metal) during reaction. The higher surface tension of oil or liquefied wax on stainless may not have the same effect or may require substantially smaller gaps to wick the liquid into the voids. It is envisioned that the copper fins will also be more forgiving for manufacturing irregularities.

It is envisioned that reactions involving oxidation reactions may require an intervening thermally conductive material. In one embodiment, a washcoated catalyst or other retaining fluid on the second fluid passageway may also serve as the intervening thermally conductive material as it fills the voids between the two layers to assist with heat transfer and thermal control of the reaction.

Strain Relief Joint

A strain relief joint, made up of two plates welded together, can be added to the stack to reduce the strain imparted to the welds joining adjacent layers in the core. The joint is designed to open (expand) as the reactor becomes pressurized during operation. By doing so, the seal welds located on the reactor's outer surfaces remain unstrained which increases the life of the unit.

The expansion joint is made up of two metal plates, typically of the same width and length of the stack. For example, in the device described elsewhere in this description, the plates are ~24" (60 cm) wide×24" (60 cm) long to match the dimensions of the other plates in the stack. Preferably, the lower plate is thinner than the top plate in the strain relief joint; for example, the base plate (i.e., the plate coplanar with and contacting the stack) can be ~0.25" (0.625 cm) thick and the top plate (the plate nearer the exterior major surface) about 0.04" (0.1 cm) thick. In some preferred embodiments, the base plate contains a plurality of holes and the top plate is featureless. The plates are placed on top of one another and aligned at the edges. The plates are then welded via a laser welding process. The edges of expansion joint plates are not continuously welded; this allows movement of the plates during operation of the device. Preferably, the weld pattern is such that the edges of the plates are not joined except at the corners. This allows the edges to separate during operation if needed to take up any expansion of the reactor without straining the seal welds on the reactor and to isolate the different internal streams from one another. The holes in the base plate allow the welds to be individually checked for leakage prior to assembling into a reactor. Once the expansion joint has passed the qualification test, the base plates holes can be filled in using a standard TIG welding process.

Preferably, two expansion joint assemblies are used in a completed reactor core; one at the top of the core and one at the bottom. Preferably, one plate of the strain relief joint is placed against the reactor core and welded to a coolant subassembly all around the perimeter.

During operation the reactor is pressurized. The pressure results in some elastic stretching of the external supports.

Without strain relief joints being present, this would lead to a corresponding stretch of the reactor core itself and result in stress induced strains developing in the seal welds. With the expansion joints present, the elastic stretching is taken up by the opening of the joints which alleviates the strains on the welds An optional step of welding on a halo (which is a made from one contiguous hollow square or rectangular metal ring or from two or more parts welded together to form a contiguous ring that protrudes above the face of the core. The halo creates a structure intermediate to the device and the final operational manifolds (macromanifolds) such that during refurbishment, the connection between the macromanifold and the device can be cut apart and rewelded or joined for a subsequent operational period. This use of a halo is particularly advantageous as a means to remove or refurbish a catalyst contained within the reactor core. Halos, devices comprising halos, methods of making devices having halos, and methods of using devices having halos are additional inventive aspects of the invention.

EXAMPLES

Example 1

Welded Subassembly—Welded Reactor—Press Fit Conductive Fin

A welded reactor was fabricated and operated to validate the equivalent performance to a brazed reactor using Fischer Tropsch as a test reaction. The reactor operated for more than 2000 hours time on stream and demonstrated that a press-fit contact of a catalyst containing process fin against the subassembly was sufficient for reactor performance and matched the performance from a brazed reactor of the same design.

Device Description

A two-layer Fischer Tropsch all-welded device was designed and fabricated to validate the inventive manufacturing process. The multichannel microreactor design consists of two process repeated units interleaved between three coolant repeated units. The coolant channels are in a cross-flow orientation to the process channels.

The process channels are created from a copper waveform 15.75 cm (6.2 inches) long by 7.62 cm (3 inches) wide and 0.635 cm (0.256 inches) high. The thickness of the waveform is 0.015 cm (0.006 inches). The resulting device has 274 process channels in two layers. Each of these channels has average dimensions of 0.095 cm (0.0375 inches) width, 0.635 cm (0.25 inches) height and 7.62 cm (3 inches) length. The fin was oversized by 0.006" (0.015 cm) from the nominal dimension of the adjacent edge strips to insure excellent thermal contact.

The coolant channels of the device comprised of laser welded subassemblies joined to a top plate with a Yb fiber laser (IPG model YLR-600-SM: 600-Watt Ytterbium Fiber Laser, 1.07 micron wavelength) with a weld thickness between 50 and 150 microns through a 500 micron top plate penetrating into but not breaking through a 1000 micron bottom channel plate. The subassemblies are created from two shims which include a top or cover sheet or walls accompanied by a channel shim which contains flow channels for the heat transfer fluid. These coolant subassemblies stacked in the ~3" L×~10" W×~2.7" H (8 cm×25 cm×7 cm) device and were sealed to the perimeter with fusion and fillet welds.

After weldment of the core components, the device was cleaned and loaded with 66.5 grams of a high activity cobalt catalyst obtained from Oxford Catalysts, Limited and silicon carbide sourced from 120 grit material supplied by Atlantic Equipment Engineers.

The final fabrications steps consisted of header and footer weldment (for the coolant and process channels for external connections to macroscale, i.e. larger piping) and support weldment. The support weldment was a structural necessity for this design which also enables the device to operate safely without the need for a pressure containment system (PCS).

Core Component Fabrication

The all-welded reactor has two Process layers that comprise a copper waveform and two stainless steel edge strips each. The three Coolant layers are interleaved with the process layers and are fabricated as subassemblies via laser welding a stainless steel top plate or wall and a stainless steel channel shim together. The wall shims were sheared to size from 0.020" (0.05 cm) thick stock SS sheet material. The coolant shims have non-straight and straight channel features that are formed via partial PCM (Photo Chemical Machining) in 0.040" (0.1 cm) thick SS sheet, creating 0.020" (0.05 cm) deep by 0.100" (0.25 cm) wide channels with 0.040" (0.1 cm) ribs for the straight channels and 0.015" (0.0375 cm) deep by 0.017" (0.0425 cm) wide channels for the non-straight section. The non-straight section was made with a wavy or serpentine pattern with 22 turns. The laser welding was done on each rib, the full length of the shim, to create a seal between channels as well as between the outermost channels and the perimeter to seal the channels from the exterior. The subassemblies were then leak checked. Having the capability to leak check subassemblies enabled identification and repair of leaks prior to assembly in a device and avoiding fabrication of a failed device. Another advantage of having the coolant layers pre-fabricated as subassemblies is the reduction of parts to stack in an assembly by at least about 20%.

The edge strips on the Process side were fabricated from standard material thickness (nominal 0.250" thick) (0.625 cm) and required minimal machining, only a cut to length and width and edge chamfering. The copper waveforms were fabricated from a standard fin forming process where thin coils are regularly bent to produce a repeating fin structure. The fins were made with a 0.256" (0.64 cm) height. The endplates required minimal machining as well to achieve the desired length, width and chamfering. All parts do not require the tight thickness tolerances associated with brazed devices and thus stock material can be used.

Device Assembly for Example 1

The core of the device (i.e. the Process and Coolant layers sandwiched between two endplates) is created by stacking components to create interleaved process and coolant layers. The number of Process layers is determined by desired capacity of FT product while the number of Coolant layers is one more than the number of Process layers such that each Process layer has a Coolant layer on both sides. During the stacking process a fixture is required to align the parts, as well as maintain alignment throughout the assembly and the initial welding steps. A clamp fixture was designed to create a platform to stack on as well as to secure the stacked core for transport to the welding step. The clamp fixture consists of two plates shaped like an elongated plus sign. Each has four (4) slots to fit ½" (1.25 cm) all-thread rods. A support plate was placed under the bottom clamp to create room for the all-thread end and nut on the bottom-side. For alignment of the Process faces, four straight edges were held in place on either side of the clamp fixture with c-clamps. A fifth straight edge was used to align one of the two coolant faces.

Figure 6:
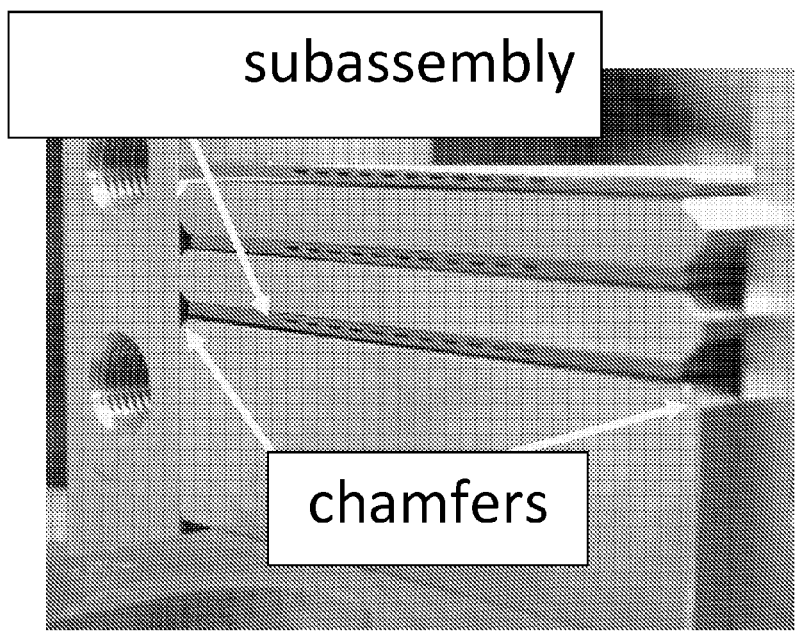
FIG. 6 shows a coolant face alignment with coolant channel assemblies and endplate chamfers.

With the stacking and alignment fixture setup, the first step is to place an endplate on the clamping fixture, centering it between the Process face straight edges. The Coolant face straight edge is then put in place before stacking the first layer. The first layer that was stacked was a coolant subassembly. Process layers are disposed between two coolant layers. The subassembly is lowered onto the endplate and slid into place against the coolant face straight edge and centered between the chamfers on the endplate (FIG. 6). Once alignment is satisfactory, the first Process layer was stacked on top of the Coolant subassembly. In this step, the edge strips were flush at the Coolant face. For the fusion welding, this seals the interface between the edge strips and coolant subassemblies and the edge strips and endplates. The first edge strip is placed flush with the coolant straight edge, followed by placement of the waveform and then the second edge strip. The waveform is placed tight against the first Edge Strip and centered on the Coolant subassembly. The second Edge Strip is placed tight against the waveform and it's alignment with the other Coolant face is checked. If the Edge Strips on both Coolant faces are aligned within +/−0.010" (0.025 cm) of the adjacent layer, alignment was acceptable. This process of stacking coolant subassemblies and Process layers was repeated one more time, followed by another Coolant subassembly. The total stack consisted of two (2) Process layers and three (3) Coolant layers. The last core component to be placed on the stack was the top endplate. The top endplate is placed flush with all four Process side straight edges and the Coolant face straight edge.

Figure 7:
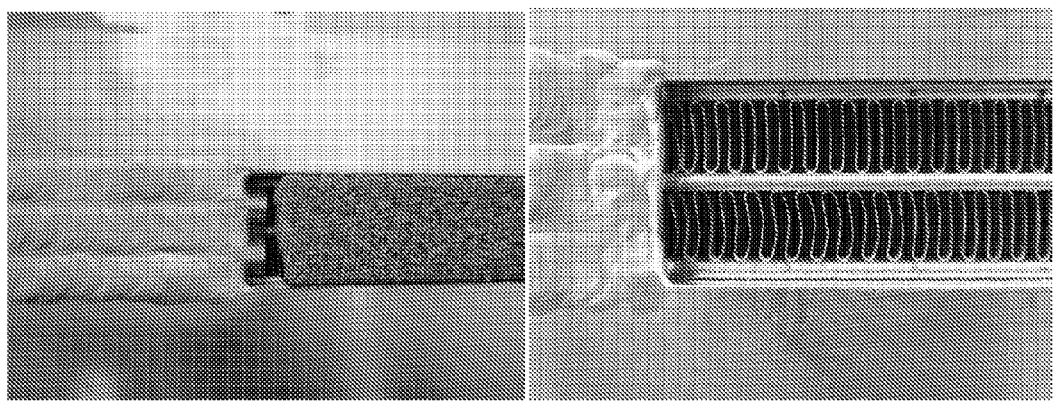
FIG. 7 is a photo illustrating a fillet weld added (picture at the right) to create a more uniform framework for the catalyst retention assembly. The irregular fin shape shown in the right side of FIG. 7 is caused by compression.

There were two weld steps to complete the core welding. The first weld step made fillet welds along the 2" (5 cm) wide Edge Strips. There were six V-grooves on each Process face that are filled with fillet welds. Curved cutout areas on the clamp fixture allowed access to these V-grooves to complete this weld step. The initial fillet welds were designed to stop short of the edge strip end closest to the waveforms to avoid damaging them. Later the fillet welds were filled in to the inside edge of the edge strips to match up with the catalyst retention assembly. The before and after pictures of these fillet welds is shown in FIG. 7. Once these fillet welds are complete the clamping fixture was removed to allow access to the coolant faces for the next weld step. On each Coolant face, there were three coolant subassemblies and hence six seams (one seam above and below each subassembly) that each had a fusion weld the full length of the face. The core is then ready for cleaning and preparation for catalyst loading.

Cleaning and Catalyst Loading

Prior to catalyst loading, the process side of the device was cleaned and a catalyst retention assembly welded in place.

Prior to loading catalyst, a catalyst retention assembly is inserted and welded in place on one process face to retain the catalyst while the core is orientated in the vertical position. The catalyst retention assembly consists of four parts: a screen, a screen retention ring, foams and a foam retaining ring. The screen functions to retain the catalyst in the device. The screen retaining ring is a thin SS frame that holds the screen in place, tight against the process face. A small weld around the perimeter of the screen retaining ring secures the screen in place and ensures good catalyst retention in the device. The fillet weld on the edge strips were also brought up to the inside edge of the edge strips to provide better catalyst retention. An aluminum shielding plate may be used to protect the copper waveforms during the perimeter weld on the screen retaining ring.

With the catalyst retention assembly in place on one process face, the catalyst loading was carried out. The loading was a four-step process. The 4 end channels (1 at each end in each process layer) have partial fins and were blocked by the screen retaining ring and thus were considered inactive channels. These channels were filled completely with Silicon Carbide (SiC), an inert material of nearly the same particle size as the catalyst in the first loading step. The remaining channels were loaded with 3-layers: ~0.665" (1.6625 cm) SiC at the process inlet, ~1.5" FT (3.75 cm) catalyst bed and ~0.75" (1.875 cm) SiC at the process outlet. To obtain the depths of each of the three layers the materials were loaded into the device in small increments, followed by pounding the side of the device (endplates) with a rubber mallet to densify the loaded material. After each incremental load and densification, gage height pins were used to measure the depth of all channels. When this process was completed for any given layer, the material was further densified via ultrasound to obtain as close to PABD (ex-situ measured packed average bed density of the material) as possible. Loading was complete when the top layer remained flush with the edge strips after densification. When the catalyst was not further densified by ultrasonification, the catalyst bed was considered to be fully densified. With all three layers (two layers of SiC, one layer of catalyst) loaded, the catalyst retention assembly was installed and welded on the open process face of the device using the same procedure as described earlier for the other process face.

Final Welding for Example 1

Three final weld steps to completed the device fabrication, viz. attachment of the process manifolds, coolant manifolds and the Support plates. Unlike brazed devices, the only internal components for the all-welded FT device that are sealed throughout are the Coolant subassemblies. The remaining components (waveforms, edge strips and endplates) are all only attached to adjacent components at the perimeter. The Support Plates provide the necessary structural support for the device to maintain its integrity under the large differential pressures during operation. The Support Plates also serve to replace the Pressure Containment Shell (PCS) used for the brazed devices. Two outlets are used for the coolant, to remove the steam and liquid water separately.

Figure 8:
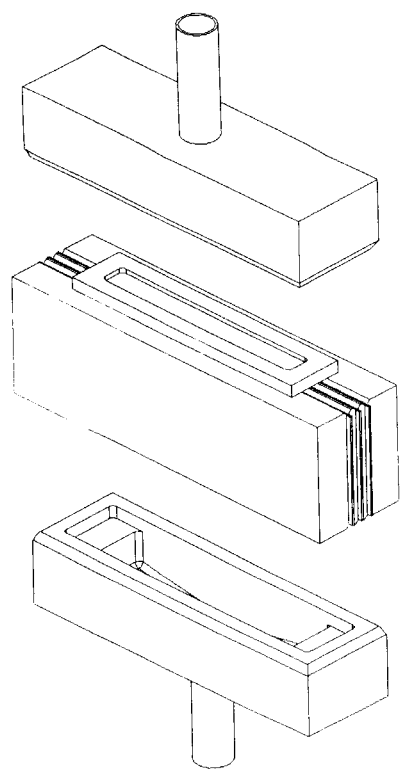
FIG. 8 shows process manifolds for the inventive reactor. The figure shows manifolds (top and bottom) and a laminated reactor core (center).

Process manifolds are constructed from Stainless Steel 304L and are approximately 9.1" (22.75 cm) long×2.7" (6.75 cm) wide×1.9" (4.75 cm) deep. An internal pocket with approximate dimensions of 8.1"×1.7"×1.2" (20.25 cm×4.25 cm×3.00 cm) totally encapsulates the process waveform opening and provides support to the catalyst retention mechanism. The manifolds are welded around the perimeter of the core using a traditional TIG welding process. One inch diameter tubes extend from the center of both process manifolds to allow the process gas to enter and exit the core. The manifolds are designed with a minimum wall thickness of approximately 0.5" (1.25 cm) in order to support the process pressure during operation. See FIG. 8.

The coolant inlet manifold is constructed from Stainless Steel 304L and is approximately 5.6" (14 cm) long×2.7" (6.75 cm) wide×1.7" (4.25 cm) deep. An internal pocket with approximate dimensions of 4.8"×1.9"×1.3" (12 cm×4.75 cm×3.25 cm) totally encapsulates the coolant inlet channels and is designed to distribute the coolant equally over the coolant inlet face. The manifold is welded around the perimeter using a traditional TIG welding process. One inch diameter tubes extend from manifold to allow the coolant to enter the core. The manifold is designed with a minimum wall thickness of approximately 0.38" (0.95 cm) in order to support the coolant pressure during operation.

The coolant outlet manifold is constructed from Stainless Steel 304L and is approximately 5.6" (14 cm) long×2.7" (6.75 cm) wide×4.4" (11 cm) deep. An internal pocket with approximate dimensions of 4.8"×1.9"×4.0" (12 cm×4.75 cm×10 cm) totally encapsulates the coolant outlet channels and is designed to let the coolant flow exit the reactor core without obstruction. The manifold is welded around the perimeter using a traditional TIG welding process. Two 1" (2.5 cm) diameter tubes extend from manifold from opposite sides. The top tube allows steam vapor to exit and the bottom tube allows liquid water to exit. The manifold is designed with a minimum wall thickness of approximately 0.38" (0.95 cm) in order to support the coolant pressure during operation.

Figure 9:
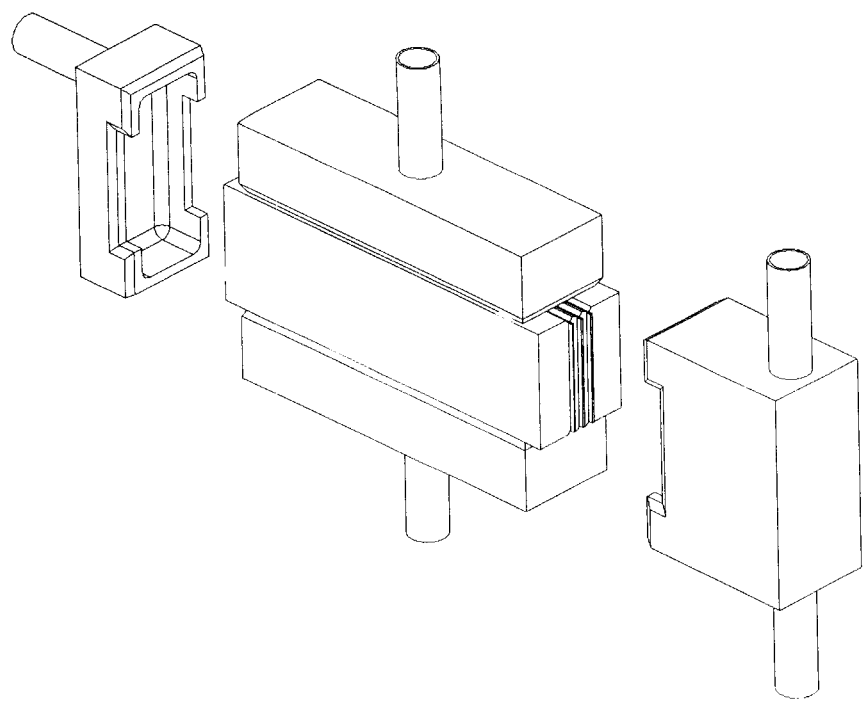
FIG. 9 shows coolant manifolds for the inventive device.

The two coolant manifolds weld directly to the solid metal core endplates and the process manifolds. By doing so, the core welds are totally encapsulated within the parameters of the process and coolant manifolds and therefore, are not directly exposed any exterior surface of the reactor. See FIG. 9.

Supports (an exoskeleton) are then added using a traditional TIG welding process. There are four sets of supports that wrap the reactor in the vertical (process flow) direction and one additional set that extends out horizontally over the coolant outlet manifold. Each set of vertical supports are constructed from two identical pieces of stainless steel 304L which have approximate overall dimensions of 8.8" (22 cm) long×3.3" (8.25 cm) tall×0.25" (0.625 cm) thick. Each set of supports are welded together at the points where there ends come into contact as well as stitch welded to the reactor around its perimeter. The four sets of supports are separated from each other by approximately 2" (5 cm) and the first set is located approximately 2.7" (6.75 cm) from the edge of the coolant inlet manifold. Whereas the four vertical sets of supports provide support for the reactor core and process manifolds, the horizontal set provides additional support to the oversized coolant outlet manifold. The two horizontal supports are constructed from stainless steel 304L and are approximately 5.4" (13.5 cm) long×2' (60 cm) tall×0.25" (0.625 cm) thick. They are centered on either side of the coolant outlet manifold and are welded to that manifold as well as to the endplates of the core and the outermost vertical supports.

Experimental Setup for Example 1

Process Side

The flow and composition of synthesis gas (syngas) fed to the Fischer-Tropsch synthesis microchannel fixed bed reactor was controlled by setting the flow rates of individual gases (carbon monoxide, hydrogen, and nitrogen) using Brooks mass flow controllers. The gases were fed through activated carbon and molecular sieve 13× traps to remove any impurities. The feed was pre-heated in a stainless steel microchannel heat exchanger prior to entering the reactor. The reactor was enclosed in a clam-shell 3000W Watlow heater and further insulated to minimize heat losses. Operational data was measured using pressure transducers, and 316SS sheath K-type thermocouples.

The product stream was routed through three collection vessels at elevated pressure, and cooled in stages to provide rough separation of lighter from heavier hydrocarbon products along with an aqueous phase. The first product tank (held at ~100° C.) and the second tank (held at ambient temperature, ~25° C.) collected the majority of the products. Aqueous phase and heavier hydrocarbon (wax) products were collected in the 1st tank while an aqueous phase and a clear liquid hydrocarbon phase was collected in the 2nd tank. The effluent gas from the 3rd tank was vented. The product gas samples were collected through a sample port located just downstream from the reactor and upstream from the first product collection tank and analyzed using an Agilent M200H micro gas chromatograph with two columns, molecular sieve 5A and PlotQ.

Coolant Side

A 20 gal (76 L) carbon steel tank was used for storing the cooling water. The water chemistry was maintained with the addition of Cortrol OS5300 and Optisperse AP302. The tank is pressurized with nitrogen to maintain the steam loop pressure. Cat Pumps (model 231.3000) were used to pump the water through the cooling circuit. An Appleton FLSC-62A flow meter was used to measure and control the coolant flow. The feed water was passed through a 25 cm, 5-micron particulate filter bank and a 60 micron Swagelok filter prior to entering the reactor. The reactor steam outlet is connected to a nitrogen source for controlling the coolant pressure while the water (separated in the coolant footer) flows to a 2 liter stainless steel Swagelok vessel, which was used for maintaining proper water level in the system.

Performance Data

The inventive all welded reactor was operated without a pressure-containment shell for ~2150 hours. The reactor had an exoskeleton welded to the exterior to provide the pressure support for this high pressure reaction.

The reactor was operated with increasingly severe operating conditions to the point of thermal runaway (about 70 millisecond contact time on the process side). After a thermal runaway event, the reactor was regenerated to evaluate the extent of damage to the catalyst. After regeneration, the catalyst recovered roughly 50% of initial activity.

Start-Up and Validation Test

The start-up of the reactor occurred as follows: After completion of the catalyst activation, the reactor was cooled to ambient temperature and then pressurized to 350 psig (2413 kPa). Cooling water was the introduced in the coolant loop at the target flow rates and the reactor was heated to the syngas introduction temperature of ~170° C. Syngas flow was then started in steps and the reactor heated to the target operating temperature.

Upon completion of the start-up, the reactor attained the condition of $H_2:CO=2.0$, P=350 psig (2413 kPa), diluent ~16.8%, CT ~290 ms. Two rows of thermocouples were tack welded on the external reactor surface at approximately 1.17 cm (0.46 in) and 3.2 cm (1.26 in) from the start of the catalyst bed (3.20 cm and 5.23 cm from the reactor inlet). The inventive all welded microchannel reactor did not create a fully isothermal reactor operation; however, the measured temperature gradients were less than about 5° C. Further, the internal gradients on the FT catalyst were not measured and are expected to be greater than the measured thermal gradients measured in the reactor walls.

The temperature profile across the face of the reactor was controlled to within ±2° C. of the average temperature.

A direct comparison of the inventive (all welded) reactor performance to the brazed reactor is tabulated below in Table 1 based on the same Fischer Tropsch catalyst:

TABLE 1

Comparison of the Inventive (all welded) reactor to that of a brazed reactor

| Reactor | Brazed reactor | Inventive reactor |
|---|---|---|
| $H_2$: CO in syngas feed | 2.0 | 2.0 |
| Dilution in syngas feed | 16.5% | 16.8% |
| Pressure | 25 bar | 25 bar |
| Contact time, millisecond | 290 ms | 289 ms |
| Temperature* | 210 C. | 206.7 C. |
| Time on stream | 231 hrs | 209 hrs |
| Performance | | |
| CO Conversion | 71.8% | 74.0% |
| $CH_4$ Selectivity | 8.9% | 8.7% |
| $CO_2$ Selectivity | 0.4% | 0.3% |
| C2 Selectivity | 0.8% | 0.8% |
| C3 Selectivity | 2.3% | 2.3% |
| Alpha | 0.91 | 0.91 |

*Note:
Temperature measurement location varies slightly between the two reactors. The temperature is measured at the coolant shim surface for the brazed reactor while it is measured on the exterior of the reactor wall surface for the inventive (all welded) reactor.

Time on stream performance of the inventive all welded reactor is comparable to the other brazed and single channel reactors at the same conditions.

The product wax collected during this validation period was analyzed for the carbon number distribution. The results showed an excellent agreement with the wax from earlier tests at similar conditions with short and long single channel reactors and brazed pilot-scale reactor tests.

Robustness to Process Upsets

At approximately 211 hours on stream, a coolant flow meter failure led to an interlock incident. The coolant flow meter failure triggered a zero flow alarm (despite the pump functioning normally) causing the back-up pump to start resulting in a significantly higher coolant flow which led to an interlock. Within 5 minutes the system was reset. The reactor had cooled to ~197° C. during that period. The CO and $H_2$ flows were immediately turned ON once the system was reset. The $N_2$ flow was turned ON 2 minutes later. The reactor temperature started to increase immediately and within 9 minutes (from system reset) the maximum temperature recorded on the reactor external surface reached ~240 C as there was no coolant flow (since the coolant channels were not drained, a pool of water from prior operation would be there on the coolant side which may have started to vaporize). As the temperature reached 240° C. (9 minutes from system reset), the coolant pumps were started manually. The reactor temperature started to drop back to normal levels. Within 28 minutes (37 minutes from the system reset) the situation was under control and the reactor had cooled to ~192 C. The reactor temperature was then gradually increased to the value prior to the interlock (~206.6 C). Upon reset, H2 flow was set to a higher value than the target resulting in a H2:CO ratio of 2.17 (instead of 2.00).

This experimental result was surprising in that thermal runaway did not occur within seconds of losing the coolant feed and that 9 minutes passed between the loss of coolant and the reactor temperature rising more than 40° C. The catalyst performance was brought back to expected levels after restarting the coolant and achieving the target temperature. The high ratio of metal reactor block volume to catalyst volume creates a thermal sink to absorb the exothermic heat of reaction for a few minutes while system upsets are reversed. This is particularly advantageous over conventional tubular fixed bed FT reactors whereby temporary loss of coolant results in a thermal runaway event and loss of catalyst performance. The inventive FT reactor creates a modest temporal buffer for undesired thermal upsets as shown for the return to expected performance after 9 minutes without coolant flow. The reactor temperature rose as expected, but the high heat capacity of the metallic structure kept the catalyst from permanently sintering.

For the all-welded pilot reactor, the catalyst volume was ~7% of the total reactor volume (63.1 ml catalyst in 0.934 L reactor block ~10"×3"×1.9" (25 cm×7.5 cm×4.75 cm)). For this ratio of reactor volume to catalyst volume of ~14:1 the thermal sink time of 9 minutes without coolant was shown to be acceptable.

For larger devices where the ratio of reactor volume to catalyst volume is less than 14:1 and more typically less than 10:1, and more preferably still less than 3:1 or 2:1, the acceptable time without coolant flow will be less than 9 minutes, and is expected be 5 minutes or less, in some embodiments, 30 seconds or less. In some preferred embodiments, the ratio of catalyst volume to reactor volume is between 2 and 60%, in some embodiments of reactors according to the present invention, between 5% and 40%; where total reactor volume includes the volume of channels, channel walls, integrated manifolds and exterior walls, but not exterior piping or pressure containment vessels.

Additionally, at ~346 hours on stream, a carbon monoxide mass flow controller was changed out due to a low dry test meter (DTM) reading for the outlet flow. The new CO MFC was set to a value lower than target resulting in an increased H2:CO ratio. During the subsequent period of 17 hours (up to ~363 hours on stream), the H2:CO ratio was ~2.36 and the CO conversion increased to a value >85%.

Surprisingly, we discovered that even at high CO conversion the rate of deactivation did not increase and performance was restored to previous levels after adjusting the feed ratio. The reactor has robust operation to a varying range of conditions, including a higher level of H2 to CO. Conventional tubular fixed bed FT reactors do not respond well to quick changes in the thermal output, including a sudden increase in the released heat from the reaction. The inventive reactor continued to operate in a stable fashion as the heat of reaction increased with a higher H2 to CO ratio. Further the performance went back to the expected performance after the syn gas ratio was restored to the target value.

Partial Boiling Evaluation Run

In the next phase of inventive reactor demonstration, partial boiling of coolant was tested and validated the thermal control and stability of the inventive all-welded reactor which only sealed the boiling flow control features (22 wavy turns of the smaller cross sectional channel at the inlet side before the main coolant channels) along a linear seam between the parallel wavy features rather than following the contours of the wavy features. There is one wavy feature section per coolant flow channel, and the simple linear seal between parallel coolant channels was sufficient to maintain stable operation in a high heat flux partial boiling controlled reaction, e.g. flow did not appear to bypass the turns along the lands adjacent to the serpentine features which would thereby lower the upfront pressure drop and potentially lead to coolant flow destabilization during boiling.

Operating conditions corresponding to the "home" condition ($H_2$:CO=2.0, P=350 psig (2413 kPa), diluent ~16.8%, The temperature was increased from 206.6° C. to ~263° C. to maintain ~70% CO conversion. As a result of this higher heat duty—the ability of coolant to remove heat was tested. The key data during this phase of operation is shown in table 2 below:

TABLE 2

Process data for the all welded reactor for varying contact time

| Contact Time [ms] | H2 Flow [SLPM] | CO Flow [SLPM] | N2 Flow [SLPM] | Temperature [° C.] | CO Conversion [%] | CH4 Selectivity [%] | Approx. Heat Duty per Channel [W] | Avg. Exit Steam Quality |
|---|---|---|---|---|---|---|---|---|
| 290 | 7.3 | 3.6 | 2.2 | 207 | 74.1 | 8.7 | 1.2 | 1.5% |
| 210 | 10.0 | 5.0 | 3.0 | 215 | 72.2 | 9.5 | 1.7 | 2.9% |
| 150 | 14.1 | 7.0 | 4.2 | 222 | 71.0 | 14.3 | 2.3 | 3.1% |
| 100 | 21.1 | 10.5 | 6.3 | 241 | 70.2 | 26.5 | 3.6 | 5.4% |
| 85 | 24.8 | 12.4 | 7.4 | 253 | 71.0 | 34.8 | 4.4 | 7.3% |
| 70 | 30.1 | 15.1 | 8.9 | 263 | 69.6 | 39.9 | 5.3 | 10.5% |

CT ~290 ms) were maintained. Starting at ~634 hours on stream, the coolant flow was lowered from ~2 LPM such that an outlet steam quality of ~1-3% boiling was achieved. The reactor temperature was also adjusted to maintain ~70% CO conversion. At ~679 hours on stream, the coolant water flow rate was decreased to 0.4 LPM and an exit steam quality of 1.5% was attained. The reactor temperature was lowered to 204.3° C. to maintain the target CO conversion. The performance is substantially similar to the single phase operation. Further, the use of partial boiling allows the reactor to be operated with higher net heat flux or heat generation from an FT reactor operated with lower contact time than the initial 290 ms.

Figure 10:
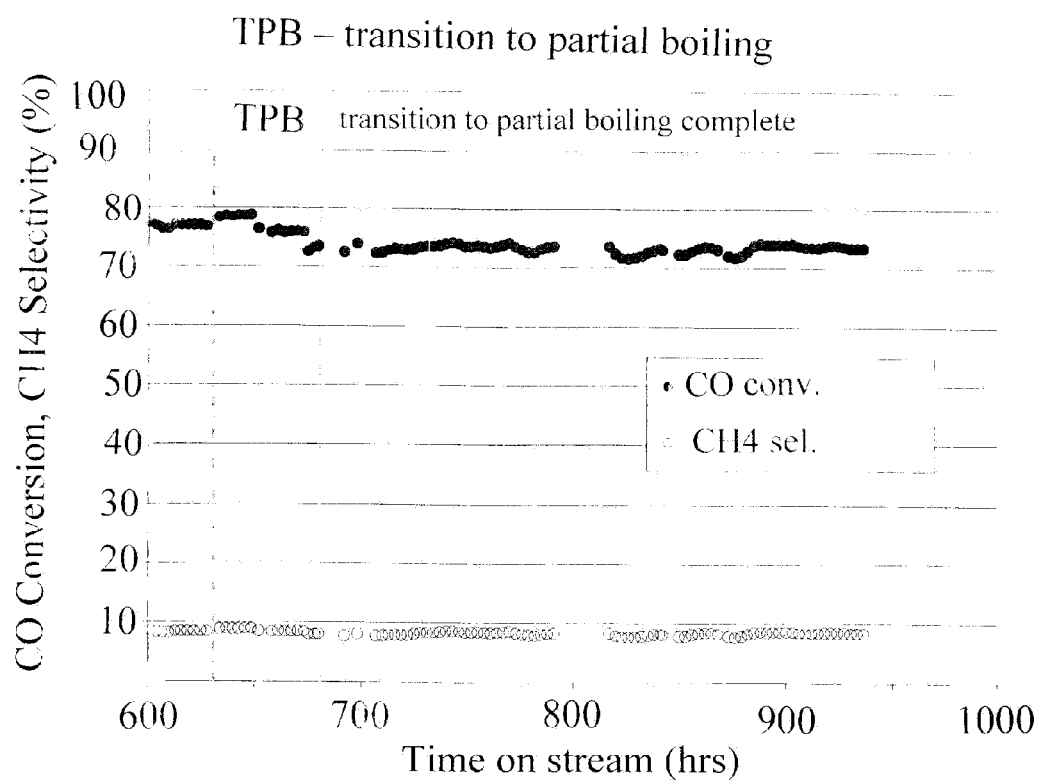
FIG. 10 shows the transition to partial boiling and the stable performance of the all welded reactor.

The partial boiling conditions were held for ~300 hours on stream and the performance during this period is summarized in FIG. 10.

The inventive reactor operated stably for >250 hours on stream with partial boiling of water and an exit steam quality of 1.5% at the "home" condition of 290 ms to substantially match the performance of the single phase coolant.

Thermal Stability Evaluation Run

In the next phase of testing, the ability of the inventive reactor to effectively remove heat was tested by increasing the heat duty of the reaction (processing more syngas by lowering contact time while maintain CO conversion by adjusting temperature). It is noted that the process fins were only press fit in contact with the coolant subassembly. The contact resistance of a press fit process fin with a coolant subassembly did not substantially change the performance of the exothermic FT reactor. Further, the press fit of the fins against one wall was hindered by a raised rib or nub on the order of 0.013 to 0.13 mm (0.5 to 5 mils) high and 0.025 to 0.508 mm (1 to 20 mils) wide arising from the laser welding method of manufacturing the subassembly.

While maintaining the 16.5% dilution, H2:CO=2, and an operating pressure of 350 psig (2413 kPa), the process reaction contact time was reduced in steps from 290 ms to ~70 ms.) For example, given the 66.5 grams of catalyst and 63.1 cm$^3$ volume of the catalyst bed, a change from 290 ms (13.1 SLPM flow) to 70 ms increases the syngas flow to the reactor to 54.1 SLPM. The composition of the syngas and the details of the transition are presented in table 2 below.

Based on the above data, the inventive welded reactor design can handle more than four times the heat load than that produced at the 290 millisecond contact time condition (with the average steam quality increasing from ~1.5% to ~10%). The individual phases of operation and comparison to similar test conditions from tests with other devices (brazed and single channel reactors) are presented below:

The inventive welded reactor was tested at a contact time of 210 ms from 945 to 1131 hours on stream. Other process parameters were held constant at $H_2$:CO=2.0, P=350 psig, (2413 kPa) diluent ~16.5%. The reactor temperature was increased to 214.6° C. to maintain target CO conversion.

The inventive welded reactor was tested at a contact time of 150 ms from 1132 to 1182 hours on stream. Other process parameters were held constant at $H_2$:CO=2.0, P=350 psig, (2413 kPa) diluent ~16.5%. The reactor temperature was increased to ~221.7° C. to maintain target CO conversion.

The inventive reactor was tested at a contact time of 100 ms from 1205 to 1350 hours on stream. Other process parameters were held constant at $H_2$:CO=2.0, P=350 psig, (2413 kPa) diluent ~16.5%. The reactor temperature was increased to ~241.2° C. to maintain target CO conversion. During a period of ~1221-1228 hours on stream, the CO mass flow controller failed due to a water drip causing an interlock incident and had to be replaced.

Figure 11:
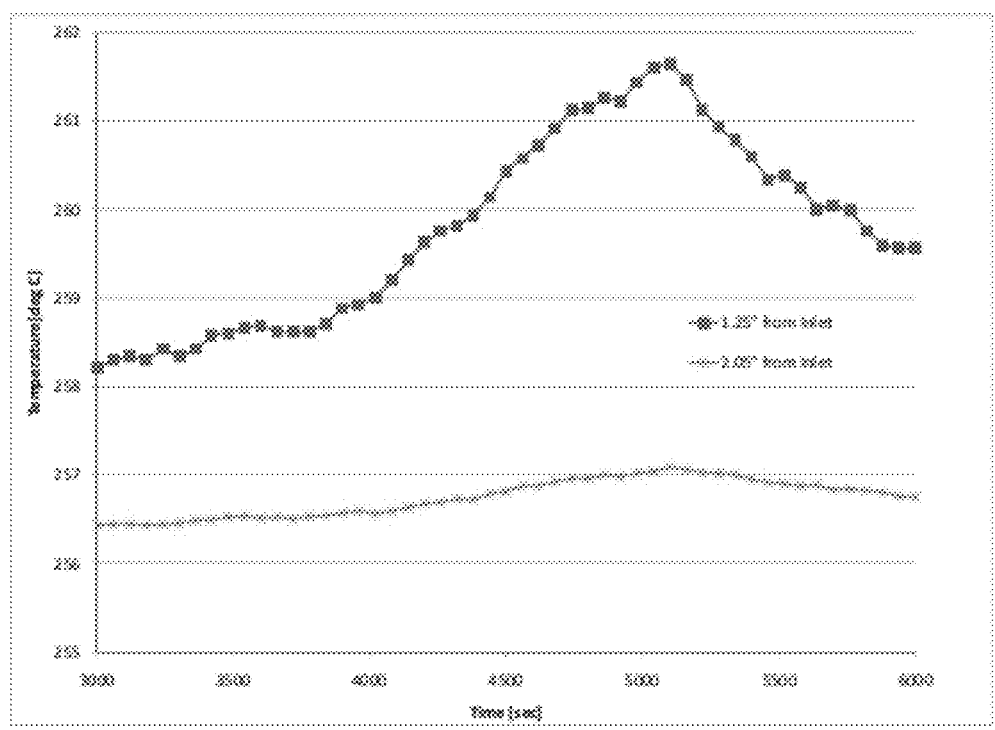
FIG. 11 shows a plot of thermal runaway in the inventive all welded reactor at a contact time of 70 ms.

The contact time was then lowered more gradually in steps of 5 ms from 100 ms to 70 ms. Other process parameters were held constant at $H_2$:CO=2.0, P=350 psig, (2413 kPa) diluent ~16.5%. At a contact time of 70 ms and a reactor temperature of ~263.1° C. (~1542 hours on stream) unsteady run-away behavior was noted at multiple thermocouple locations on the reactor. A sudden rapid increase in the temperature is seen at constant conditions (prior to the run-away being controlled by lowering the reactor temperature) as indicated in the graph in FIG. 11.

Figure 22:
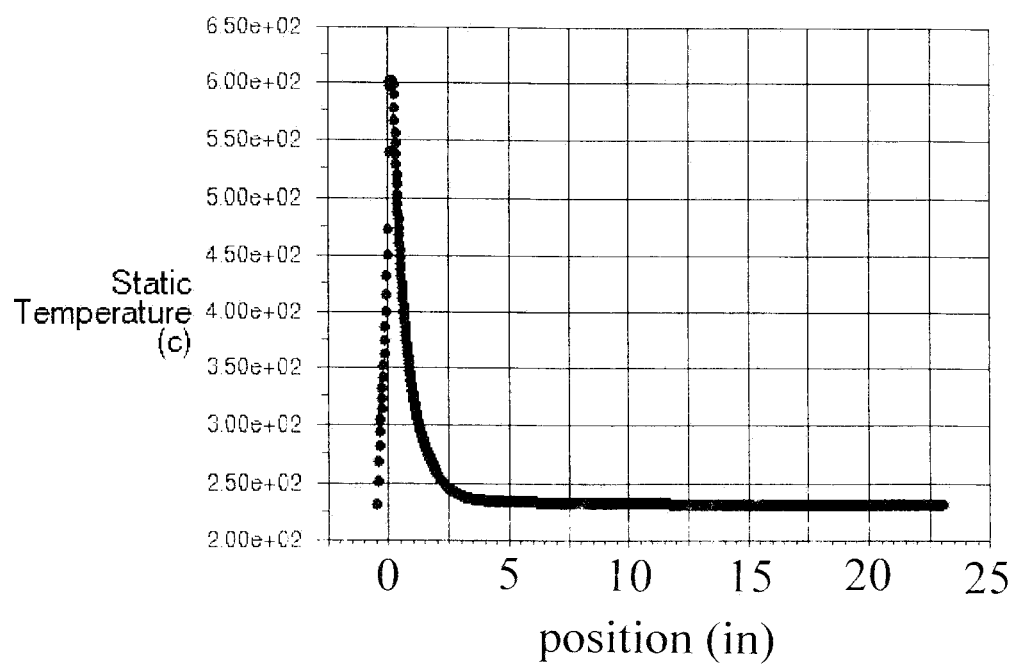
FIG. 22: Example 10: Catalyst temperature along centerline of the packed bed. Fin height at 1.0" (2.5 cm).

The temperature described in FIG. 22 is measured in on the external metal wall of the reactor which is on the opposite surface of the 1.27 cm (0.5 in) thick support plate that is in contact with the outermost coolant channel. The metal temperature rise is less than 10° C. but indicative of a temperature rise on the catalyst bed estimated to be greater than 50° C.

During this period of operation, the higher capacity of the inventive welded reactor was also demonstrated. The wax material from the 290 ms, 210 ms and 150 ms contact time operation was analyzed to calculate the alpha number. The device performance is summarized below in Table 3:

TABLE 3

Demonstrated high capacity performance of the inventive all welded reactor with alpha value 0.89 or greater for the product wax.

| Performance | Contact Time | | |
|---|---|---|---|
| | 290 ms | 210 ms | 150 ms |
| | Temperature | | |
| | 206.5° C. | 214.6° C. | 221.7° C. |
| CO conversion | 74.1% | 72.2% | 71.1% |
| CH4 Selectivity | 8.7% | 9.5% | 14.4% |
| C5+ Productivity | ~0.7 GPD | ~0.95 GPD | ~1.1 GPD |
| kg C5+/Lcat/hr | 1.24 | 1.75 | 1.99 |
| Alpha | 0.91 | 0.91 | 0.89 |

For a contact time greater than 210 milliseconds, the alpha value was equal to 0.91 or greater. Alpha is defined classically as known by one skilled in the art of Fischer Tropsch chemistry.

Steam Quality/Partial Boiling Stability Evaluation Run

In this part of the study from 1662 hours on stream to 1783 hours on stream, the coolant flow was lowered from 0.5 LPM (keeping other operational parameters constant at H2:CO=2, 16.5% dilution, 350 psig (2413 kPa) process pressure) to increase the extent of boiling at the same heat duty and achieve higher exit steam quality. At ~1712 hours on stream, at 0.2 LPM of flow, the flow meter reached its lower limit of reading and the water flow rate could not be lowered any further. The average steam quality during this phase of the test increased to ~15% as illustrated in the table 4 below:

TABLE 4

Inventive all welded reactor performance at varying exit steam quality

| Contact Time [ms] | Coolant Flow [LPM] | CO Conversion [%] | CH4 Selectivity [%] | Average Exit Steam Quality [%] |
|---|---|---|---|---|
| 278 | 0.41 | 73.3 | 8.2 | 1.5 |
| 150 | 0.53 | 71.0 | 14.3 | 2.9 |
| 70 | 0.50 | 69.6 | 39.9 | 10.5 |
| 90 | 0.37 | 57.8 | 34.1 | 8.9 |
| 90 | 0.22 | 57.8 | 34.1 | 14.8 |

Pressure on Laser Welded Subassembly

During the operation of the FT reactor the laser welded subassembly moves from compression to tension on the subassembly as the fluid pressure inside the coolant subassembly increases with time on stream. Specifically, the section of the coolant subassembly that is adjacent to process layers is smaller than the entire coolant subassembly. For the all welded reactor described in this example, roughly 60% of the subassembly is adjacent to the finned process layer and will undergo changes in compression and tension. A larger reactor with a 24"×24" (60 cm×60 cm) subassembly will have more than 80% of the subassembly surface area transitioning between compression and tension as the boiling temperature is changes with the pressure. The reaction temperature is typically increased for a Fischer Tropsch reaction as the catalyst deactivates with the buildup of wax. A typical starting temperature is between 200° C. and 210° C. where the boiling temperature from the steam curve is roughly between 210 and 260 psig (1448 and 1793 kPa). The process feed pressure is typically between 250 psig and 450 psig (1724 and 3101 kPa). The temperature is raised by increasing the pressure on the coolant side. At 220° C., the steam pressure during boiling (the preferred method for removing the exothermic heat of reaction for Fischer Tropsch) is roughly 320 psig (2206 kPa). At 230° C., the steam pressure is roughly 380 psig (2620 kPa). For the experiments described in this example, the process temperature was raised to above 250° C., where the steam pressure is roughly 560 psig (3861 kPa) and significantly above the process reaction pressure. At the start of run, the laser welds were in compression from the higher pressure on the fin or process side. At the highest temperature, the laser welds were in compression and were as high as 332 psig (2289 kPa) greater pressure on the coolant side than the process side. Before and after regeneration, the reaction temperature was dropped to below 220° C. and the laser welds were returned to compression rather than placed in tension. The laser welded subassembly was robust to operating in both compression and tension and back to compression within a time span of more than 1000 hours time on stream. Further, not only were the laser welds robust to operating in either compression or tension and back again, but the thermal contact of the fin and catalyst compaction was not affected by pressure changes within the device. An important parameter for maintaining good performance of this inventive reactor is a well loaded catalyst bed, preferably where the catalyst load density is within 2% and preferentially 1% of the theoretical PABD (packed average bed density) as determined externally by ASTM methods for a particulate material. A cold flow pressure drop test may be used to compare actual pressure drop versus that predicted from the Ergun equation. If the pressure drop is not within 5% (with 2% preferred) of predicted from the Ergun equation then the bed is poorly packed. If the bed is poorly packed, there will likely be deleterious effects of flow channeling in the reactor and the change between compression and tension with respect to the process and coolant channels may lead to an increase of unwanted forces on catalyst particles such that attrition or grinding could occur. If the catalyst particles were to break apart, then the resultant small particles would likely lead to a higher pressure drop in some channels over others and could lead to flow maldistribution, hot spots, or premature thermal runaway.

To summarize, the performance of the all welded reactor was validated and demonstrated that brazing and/or diffusion bonding are not required. The thermal contact enabled by the all-welded manufacturing technique provided desirable results.

The initial coolant pressure over process pressure was limited to ~50 psi (345 kPa) to prevent the popping of the welds between the coolant channels and deformation of the waveforms based on the size of the laser welds for this inventive reactor and burst testing of similar sized laser welded parts. During the run, this overpressure was increased to ~332 psi (2289 kPa) and no externally visible deformation was noted. After testing, a reactor autopsy confirmed that no reactor internals were compressed or deformed or otherwise undesirably changed. This surprising result suggests that the catalyst loaded fins provided structural support for these small laser welds, which were 0.002 inches (0.005 cm) wide. Laser welds on can be made wider, for example, 0.006 inch (0.0150 cm) or greater to allow for a full high pressure operation on the coolant without requiring support from the catalyst loaded process channel. Thus, in preferred embodiments, apparatus and methods according to the invention use laser welds having a width of 0.015 cm or greater.

Example 3

Large Sheet Laser Welds

Three types of parts were tested for the inventive reactor to show the impact of dissimilar part thickness for the laser welded subassemblies. It was originally theorized that thinner top sheets would create less distortion because the energy input to form the weld was lower. Surprisingly, it was found that the thinner top sheets gave more distortion rather than less. The thicker top sheets were preferred.

Top sheet welded to a coolant channel shim ranged from 0.020" (0.05 cm) Wall, 0.010" (0.025 cm) Wall, and a 0.005" (0.025 cm) (0.125 cm) Wall Initial welding was conducted with intermittent laser welds to help fixture the parts. (e.g every fifth Row). Before the long seam weld lines were made, intermittent laser welds along the weld length dimension were added in every fifth row. The intermittent stitching was roughly 2 to 4 cm long and separated by un-welded sections of 5 to 20 cm in length The Top plate was then removed and Full Length Welding was performed Power setting and focus needed to be adjusted for the two thinner wall scenarios
60% power setting for the 0.010" (0.025 cm) Wall
50% power setting for the 0.005" (0.0125 cm) Wall The initial thought was the distortion would be less as the wall thickness and power were reduced, however the opposite occurred. The 0.020" (0.05 cm) Wall Subassembly was measured and showed ~2.750" (6.875 cm) distortion.

Subsequent testing on the 0.010" (0.025 cm) and 0.005" (0.0125 cm) walls showed the following stress deformation numbers:

0.010" (0.025 cm) Subassembly measured 2.906" (7.265 cm)
~0.005" (0.0125 cm) Subassembly measured 2.961" (7.4025 cm)

In the tested assemblies, there were over 161 24" (60 cm) long welds along the 24" (60 cm) width of the assembly and the stresses seen in these components are not a surprise, but are the longitudinal and transitional stresses normally seen when performing long welds. The challenge is to mitigate the stresses during the weld process or to reduce/remove the stresses after the subassembly process.

Preferably, individual top sheets have a thickness of 0.04 cm or greater, in some embodiments, in the range of 0.04 cm to 0.2 cm; more preferably, 0.05 cm to 0.1 cm. "Top sheet" refers to the sheet that is placed over a sheet or multiple sheets that contain channels or other voids; the top sheet seals the channels or voids in the height direction and completes a subassembly.

Pre Cambering Test for Large Parts

Figure 12:
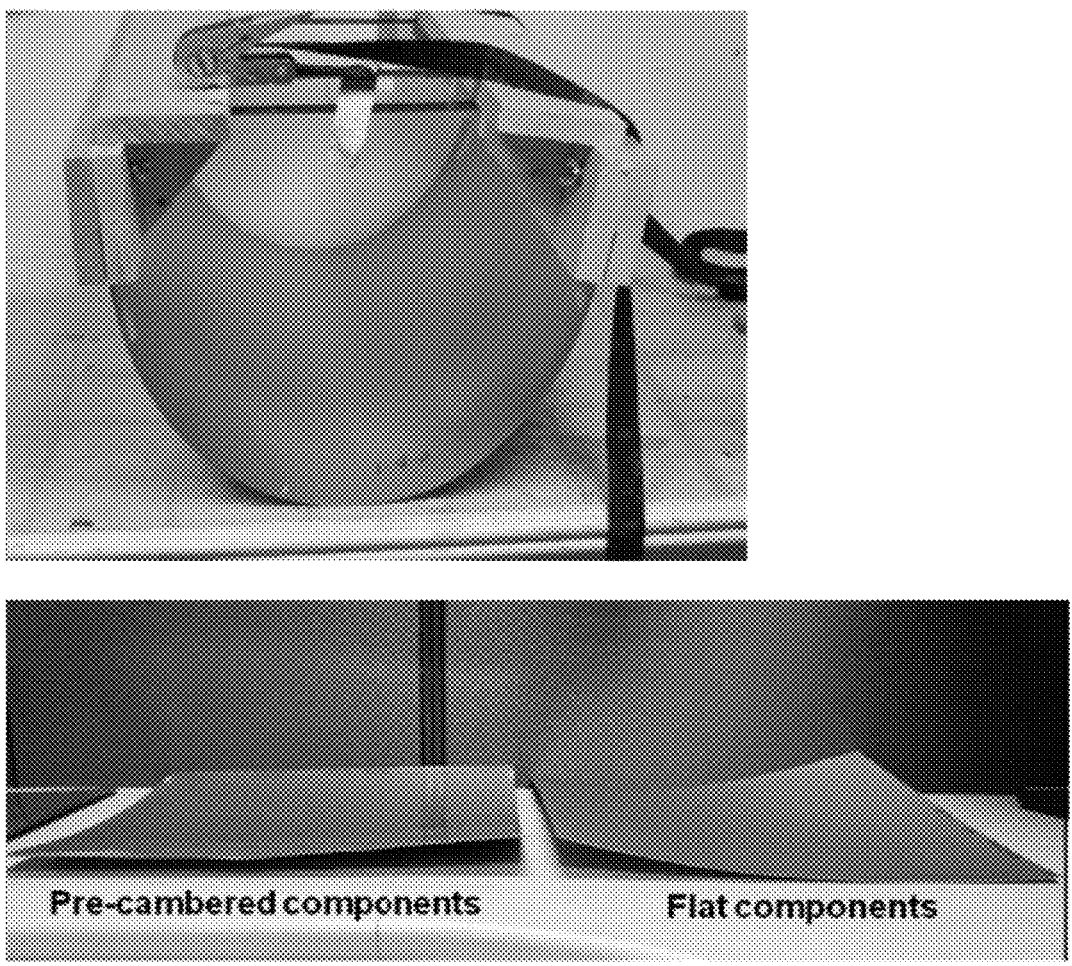
FIG. 12 illustrates pre-cambering with the pre-camber in parallel with the coolant channels to reduce curvature.

One method for mitigating the stresses of welding was by means of pre-cambering (pre-bending) components then performing the operation was tried out. The following process was used:

Process
Pre-camber Coolant Wall and Coolant channel Shim as one unit
Load fixture onto laser weld table and perform set-up and laser alignment
Perform Laser Stitch program
Re-fixture onto laser weld table
Perform Full Weld Program Pre-cambered components were made by using fixturing that consists of clamps and tie down straps to allow for a controlled and consistent flex of the components (see FIG. 12). The sheets were bent in the direction perpendicular to channel length. Two sheets were pre-cambered with this technique and then welded. The resulting subassembly was visually compared to a subassembly made similarly but without pre-cambering.

Stress relieving at temperatures below 400° C. is an acceptable practice but results in only modest stress relief. One hour at 870° C. typically relieves about 85% of the residual stresses. However, stress relieving in this temperature range can also precipitate grain boundary carbides, resulting in sensitisation that severely impairs corrosion resistance in many media. To avoid these effects, it is recommended that a stabilised stainless steel (grade 321 or 347) or an extra-low-carbon type (304L or 316L) be used, particularly when lengthy stress relieving is required. Stress relieving the large part was tried at 400 C and at a higher temperature, 1100 C. For both cases, limited success was noted. A modest reduction in deformation was observed, 40% of the original warpage as measured by the distance one edge lies above flat.

Annealing (often referred to as solution treatment) not only recrystallises the work hardened grains but also takes chromium carbides (precipitated at grain boundaries in sensitised steels) back into solution in the austenite. The treatment also homogenises dendritic weld metal structures, and relieves all remnant stresses from cold working. Annealing temperatures usually are above 1040° C., although some types may be annealed at closely controlled temperatures as low as 1010° C. when fine grain size is important. Time at temperature is often kept short to hold surface scaling to a minimum or to control grain growth, which can lead to "orange peel" in forming.

Example 4

Fin Impact in Welded Reactors

Waveforms comprising press-fit fins with high aspect ratios are likely to not be straight, but have some bow or bend to the fins. After compressing into contact with two solid strips on either side of the fins, the fins bend or bow even more. In the inventive welded reactor, the fins are pressed to the adjacent surfaces, rather than brazed or bonded, resulting in more contact resistance or thermal resistance at the point contact of the fins with the adjacent surfaces. In exothermic or endothermic reactions, the heat of reaction is transferred between the fins and the adjacent surfaces. To improve thermal contact with a press fit, the fins are taller than the supporting edge strips. As the fins are compressed into contact by an external load, they bend or buckle. As the fins bend, they are less likely to retain inherent strength.

Figure 13:
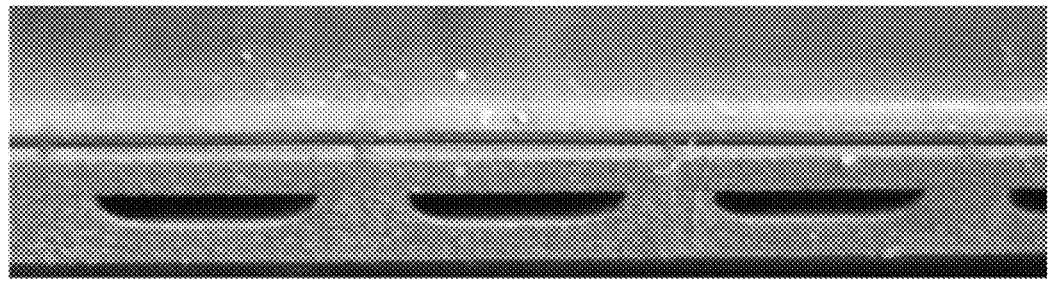
FIG. 13 is an autopsy photo of a press fit fin adjacent to the ridges formed from the laser welding process. The fin contacts on the ridges and then a small crevice crack can be observed between the fin and the heat transfer wall.

Press fit fins of 0.006" (0.015 cm) thick Cu110, 0.256" (0.64 cm) high compressed against edge strips that are 0.25" (0.63 cm) high. The fins become more eccentric as they are pressed against the adjacent heat transfer walls. In the photograph in FIG. 13, the horizontal lines can be seen where the fins sit on top of the laser weld lines that seal the cross flow heat exchange channels.

The press fit reactor described in Example 1 performed surprisingly well, matching the performance of the brazed reactor which did not have the laser welding ridges separating the fin from the heat transfer wall resulting from a combination of the high thermal conductivity of the copper fin conducting more heat to the heat transfer wall—including aided by axial conduction to better points of thermal contact, and or the filling of the small gap (estimate between 5 and 150 microns) with hydrogen and or Fischer Tropsch liquids produced during the reaction. The thermal conductivity of hydrogen and the liquid oil is substantially higher than most gases and thus will reduce the impact of a poor contact resistance between the press fit fin and the heat transfer wall. Further, the advantageous use of copper with a very high thermal conductivity enables efficient axial conduction to move heat to the heat transfer interface without building up a hot spot and creating or exacerbating unwanted side reactions.

A load of 2600 psi (17,926 kPa) was applied to the stack to bring the stack into contact. A preferred range of loads may be from 500 psi (3447 kPa) to 500,000 psi (3,447,000 kPa) depending upon the height of fin, the fin material, the fin thickness, and the eccentricity of the starting fin. After compression and the first TIG welding along the side bars or edge strips is complete, the fin contact is made with the heat transfer subassembly.

Example 5

Large Laser Welded Subassembly Linear Density of Weld Per Unit Area of Subassembly This example describes a 24"×24" (60 cm×60 cm) laser welded subassembly with laser weld lines running along the 0.6 m length with the direction of coolant flow. There were 161 coolant channels on this panel and 162 laser weld lines to seal the device between the coolant channels and provide structural support to prevent deformation of the equipment during operation at pressure.

For this sample, there is 97.2 m of linear weld in a 0.6 m×0.6 m part or a linear weld density of 270-m per m2 of surface area. Alternatively, the linear density could be described as 2.7 cm/cm2 in a 3600 cm2 size part for this embodiment. For other embodiments, the linear density of welds could be greater than or less than 2.7 cm/cm2 and, in preferred embodiments, may range from 0.1 cm/cm2 to 10 cm/cm2.

Example 6

Laser Weld Registration

Figure 14:
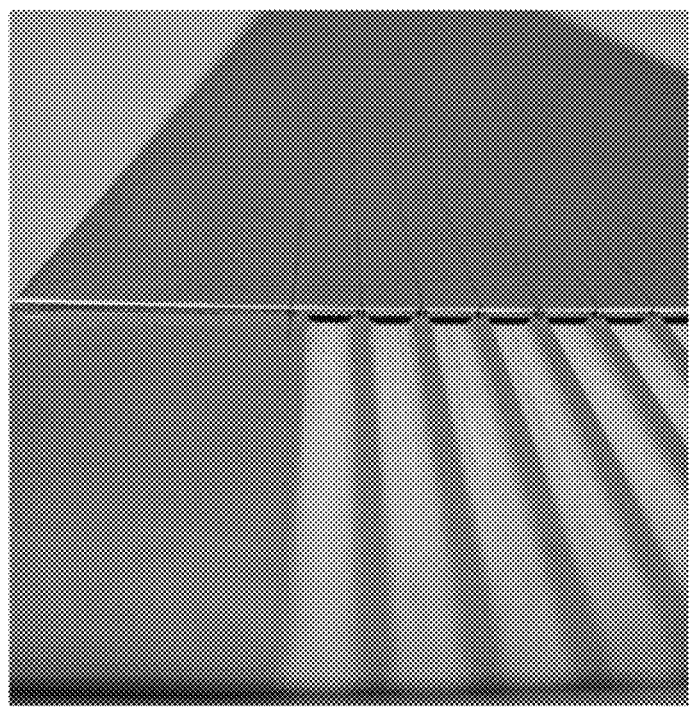
FIG. 14 shows laser weld lines that join the top of the ribs between parallel and adjacent coolant channels formed in the bottom plate.

FIG. 14 shows laser weld lines that join the top of the ribs between parallel and adjacent coolant channels formed in the bottom plate. The laser weld joins the bottom channel plate to the top plate. The laser weld may be applied along the tops of the ribs that are formed in the bottom or channel plate. In this example, the rib is 0.037" (0.093 cm) wide and the laser weld width may vary from 0.002" (0.005 cm) to 0.01" (0.025 cm) wide. The laser weld may be in the middle of the rib, or to either side or anywhere along the width of the rib.

Example 7

Manufacturing a Large FT Reactor

The all welded Fischer-Tropsch reactor core is built primarily as dual layer assembly of alternating coolant and process portions. A feature to this design is that a coolant sub-assembly is welded in such a way that it maintains mechanical integrity as a standalone unit. One process of creating such a sub-assembly is by using laser welding to join a top solid shim to a featured shim by placing welds between each channel, running parallel to the ribs. It has been demonstrated that the required mechanical integrity can be obtained with such an approach. A second parameter that must be addressed is that of part flatness. Welding two thin sheets in such a manner can cause considerable sub-assembly deformation due to the material shrinkage associated with welding stainless steel. Sub-assembly deformation can lead to added complexity and effort required to either re-flatten the pieces or adapt the stacking process the handle the deformed pieces.

One method that has been found to minimize the distortion due to welding is to limit the overall size of the sub-assembly. It has been found that by using a subassembly that incorporates 24" (60 cm) long welds between channels but which is limited to approximately 6" (15 cm) in width maintains an acceptable level of flatness whereas a similar assembly that is includes a width of 24" (60 cm) does not (e.g. overall part is 6"×24" vs 24"×24", (15 cm×60 cm vs 60 cm×60 cm)). Furthermore, multiple of these 6" (15 cm) wide sub-assemblies can be stitch welded together and maintain reasonable flatness. In this manner, a 24"×24" (60 cm×60 cm) flat subassembly can be built by stitch welding four 6"×24" (15 cm×60 cm) subassemblies together which is substantially flatter than a 24"×24" (60 cm×60 cm) subassembly welded from starting 24"×24" (60 cm×60 cm) parts.

Another useful feature which can be built into the welded sub-assembly is one which will allow the pieces to be accurately checked for leakage and mechanical integrity prior to using them to build the entire FTR welded stack. This can be accomplished by slightly oversizing the initial sub-assemblies, adding a port through which pressure can be applied, and initially sealing the ends of the sub-assemblies as part of the laser welding process. This pressure test can be hydrostatic or pneumatic. After the individual pieces have been welded and qualified the assemblies go through a trimming step that cuts them to the correct 6"×24" (15 cm×60 cm) size and which opens the flow ends of the channels followed by stitch welding four 6" (15 cm) sub-assemblies together to form one 24"×24" (60 cm×60 cm) coolant subassembly.

The final subassemblies are then interleaved between process layers to form the main reactor core. The stacking process consists of first putting down a 2" (5 cm) thick clamp plate, followed by a 1" (2.5 cm) thick endplate and then proceeding with the alternating coolant and process layers. The stacking ends by placing a final coolant subassembly, followed by a top end plate and top clamp plate. Pressure is applied to the stack to pre-compress the copper waveforms while bringing all components into metal to metal contact. The applied pressure may range from 20 psi (138 kPa) to 500,000 psi (3447000 kPa), with a preferred range of 20 to 20,000 psi (138 kPa to 138000 kPa) and a more preferred range of 20 psi to 5,000 psi (138 kPa to 34474 kPa). The stack is then secured into place using a clamping system prior to releasing the applied pressure. The clamping system maintains the stack in this compressed state so that the core welding can take place.

The core welding consists primarily of three steps: adding strength welds two both process faces, adding seal welds to both coolant faces, and adding two endplate sealing welds on each process face to prevent bypass. The reactor remains in the clamp state during each of these welding steps to ensure the best thermal contact possible within the core. Note that each of the three core welding steps serves a unique purpose. The strength welds that occur on the process faces are applied first and give the overall stack enough mechanical strength that the core can be easily manipulated (lifted, rotated, or otherwise oriented) during the other two weld steps as well as all subsequent fabrication steps. The seal welds that occur to the two coolant faces are the primary welds that guard against internal cross leaks (process to coolant or vice versa) within the reactor. The endplate seal welds are used to seal the outermost coolant subassemblies to the top and bottom endplates. Although these are sealed on the coolant faces to avoid cross leakage, they must also be sealed on the process faces to avoid process gas flow moving between these parts and thus bypassing the catalyst bed. It is noted that the catalyst is loaded into the reactor and in between the process fins after final assembly.

Before the core is welded into an assembly, the reactor should be substantially leak free. The welded reactor has not yet been prepared to withstand any significant internal pressure, so a bolt on clamping mechanism can be used to provide support. Once the reactor core is qualified it proceeds to have the coolant header welded in place. Once this step is done the reactor can go through coolant side flow testing if desired or warranted. The corresponding coolant footer is then welded in place. Both coolant manifolds are suited for operation and provide part of the foundation of the external support system of the reactor.

Figure 15:
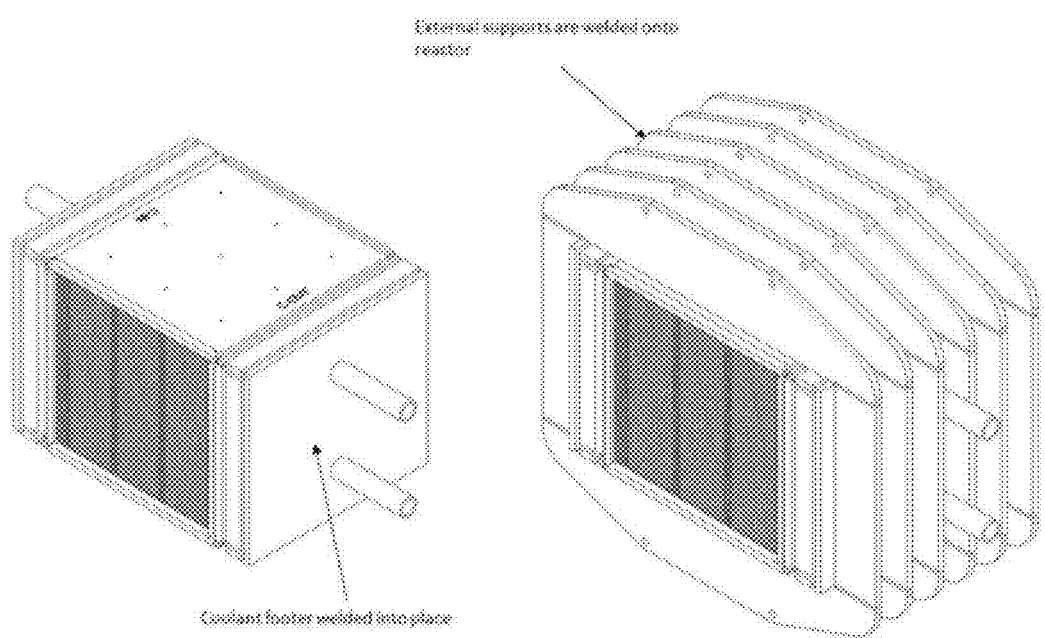
FIG. 15 shows a laminated reactor core (left) and the reactor with external supports (an exoskeleton).

Since, with the exception of the coolant subassemblies, all welding has been done to the perimeter of the core the reactor cannot withstand a significant internal process pressure without deflecting out the top and bottom endplates due to the pressure induced load and hence the reactor cannot achieve operating conditions in its current state. In order to give the reactor mechanical integrity, a system (an exoskeleton) of external supports are welded around the reactor core. These supports are designed to counterbalance the internal process pressure and thus control any pressure induced deflection of the top and bottom plates to an acceptable level. The external supports act as stiffeners welded across both top and bottom endplates of the reactor and which are then joined from top to bottom. They counter balance any loads created by internal pressurization and hence prevent any deformation that might otherwise occur. They are less thick than tall with multiple sets spanning across the reactor (see FIG. 15). Preferably, each stiffening element is at least 3 times, more preferably at least 5 times taller than thick (taller refers to height in the stacking direction). In some embodiments, the spacing between sets of supports, as well as their thickness and height are determined based on the process loads to be balanced. In one example, the supports are created from 0.75 inch thick stainless steel plate extending approximately 8" high across the top and bottom endplates with approximately 3" spacing between them. As a final qualification step, the core can have temporary manifolds welded onto the process faces and undergo high pressure testing to confirm the reactor has met the design criteria. After this step the process manifolds are removed and the core can be prepped for catalyst loading, after which the final process manifolds are welded in place.

Figure 16:
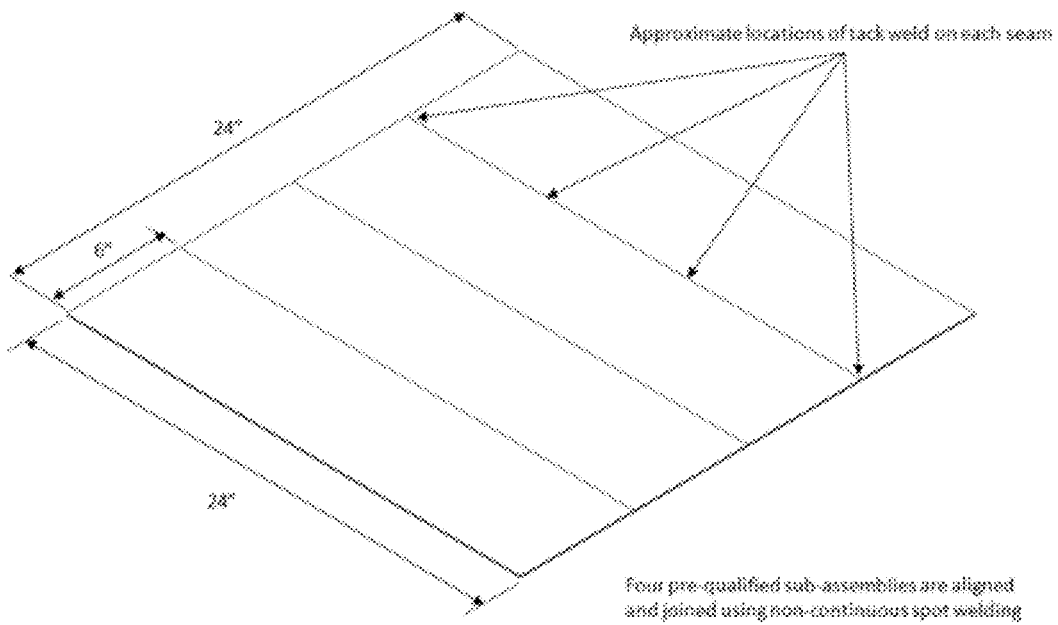
FIG. 16 illustrates an assembly formed from 4 subassemblies that were joined by spot welding.

FIG. 16 illustrates an example in which four 6"×24" (15 cm×60 cm) sub-assemblies are placed side by side and welded in several locations to join into a 24"×24" (60×60 cm) assembly. Spot welding is preferred to join subassemblies in this manner because continuous welds were found to lead to more deformation.

Example 8

The device of example 8 is a welded reactor or device which provides for cross-flow heat transfer between two fluid streams. Alternate flow configurations could be used, but the specific described example is cross flow. External supports were welded in an array (see FIG. 17) to the outside of the device core to allow pressurization of internal passageways in the device relative to a low pressure external environment without compromising device integrity or losing containment. The "exoskeleton" or array of external supports enables the device to withstand high pressure differentials to the external environment. The device was constructed of 304L stainless steel, including the external supports. The use of an exoskeleton allows for the operation of a welded reactor for Fischer Tropsch reactions and other reactions or heat exchange applications or high pressure operations without the use of an external pressure vessel. The devices are in tension rather than in compression as present with an external pressure vessel with a higher pressure fluid surrounding the inventive reactor or device.

The 61 cm by 61 cm by ~6.5 cm device core of Example 8 was made up of layers which are welded around the perimeter, as described in the attached application. The external supports were 1.9 cm thick by 105 cm long, with a width of about 14 cm near the ends and about 17 cm in the region adjacent the 61 cm by 61 cm face. The supports were spaced 10.2 cm apart (center to center), with 1.9 cm thick cross-members placed between the supports along each end of the device (so that the two rows of cross members are about 60 cm apart). The weldments between external supports and cross members were full penetration bevel welds.

Figure 18:
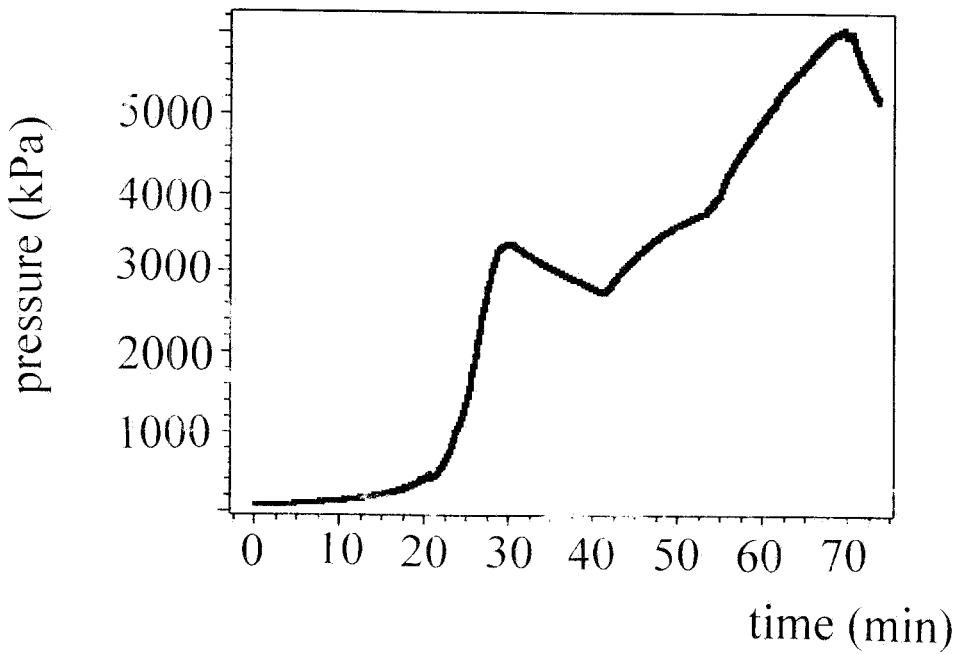
FIG. 18 shows a plot of a pressure cycle used for hydrostatic testing of the process circuit of the device of Example 8.

A hydrostatic test was first performed on a process stream flow circuit. The procedure used (shown graphically in FIG. 18) was as follows:
1. Determine the baseline leak rate during pressure test with nitrogen at about 690 kPa (psig).
2. Fill the device with water using a pump (in this Example a Lab Alliance HPLC "Prep Pump" was used).
3. Use the pump to raise the pressure from ambient pressure (i.e. <450 kPa) to ~3300 kPa (464 psig) at a rate of ~300–400 kPa/minute.
4. Drop the pressure at a rate of ~50-100 kPa/min to below ~3000 kPa (420 psig).
5. Use the pump to raise the pressure from ~3000 kPa (420 psig) to ~3700 kPa (522 psig) at a rate of ~50–100 kPa/minute.
6. Use the pump to raise the pressure from ~3700 kPa to >6000 kPa (855 psig) at a rate of ~100–150 kPa/minute.
7. Drop the pressure at a rate of ~250–300 kPa/min to below 5300 kPa (754 psig).
8. Continue to drop the pressure until ambient conditions are reached and drain the water from the device.
9. Repeat Step 1.

Figure 19:
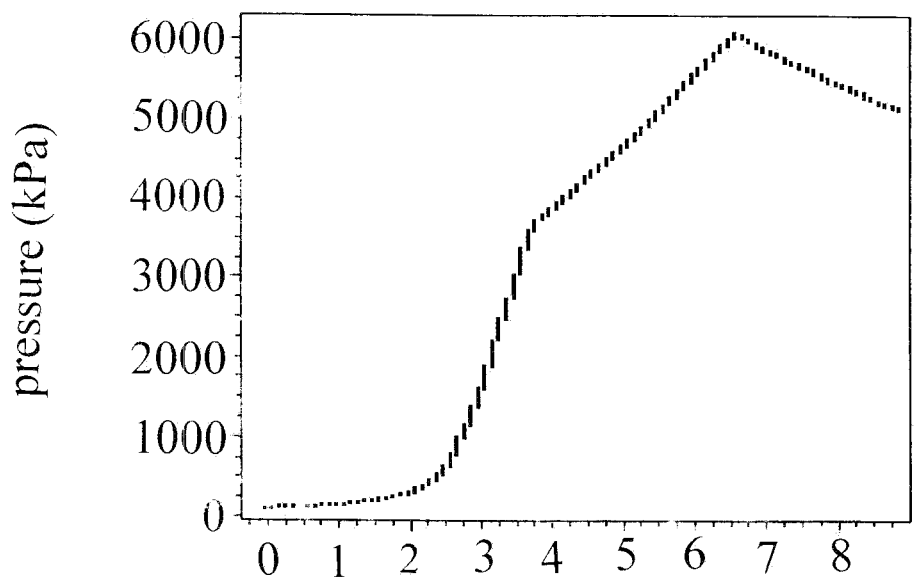
FIG. 19 shows a plot of a pressure cycle used for hydrostatic testing of the coolant circuit of the device of Example 8.

A second hydrostatic test was then performed on the coolant stream flow circuit. The procedure used (shown graphically in FIG. 19) was as follows:
10. Fill the device with water using a pump (in this Example a Lab Alliance HPLC "Prep Pump" was used).
11. Use the pump to raise the pressure from ambient pressure (i.e. <250 kPa) to ~3500 kPa (495 psig) at a rate of ~2000–2500 kPa/minute.
12. Use the pump to raise the pressure from ~3500 kPa to >6000 kPa (855 psig) at a rate of ~800–900 kPa/minute.
13. Drop the pressure at a rate of ~400 kPa/min to below 5200 kPa (740 psig).

14. Continue to drop the pressure until ambient conditions are reached and drain the water from the device.
15. Re-check the leak rate at about 690 kPa (100 psig) and compare with the baseline pressure test leak rate.

Hydrostatic testing of the coolant and process circuits was performed using the above protocols. The device showed no indication of mechanical failure during hydrostatic testing. The leak rates from coolant circuit to process circuit before and after this hydrostatic testing measured as drop in pressure over 15 minutes time with 690 kPa (100 psig) initial pressure in the coolant circuit were 0.6 kPa (0.09 psi) and 21 kPa (3.05 psi), respectively. The device was then repaired via welding and the leak rate from coolant to process circuit was measured as 2.2 kPa (0.32 psi) drop in pressure over 15 minutes time with 690 kPa (100 psig) initial pressure. Repair welding was conducted using a fiber laser. Alternatively, TIG, MIG, or other conventional methods of welding could be used.

Figure 17:
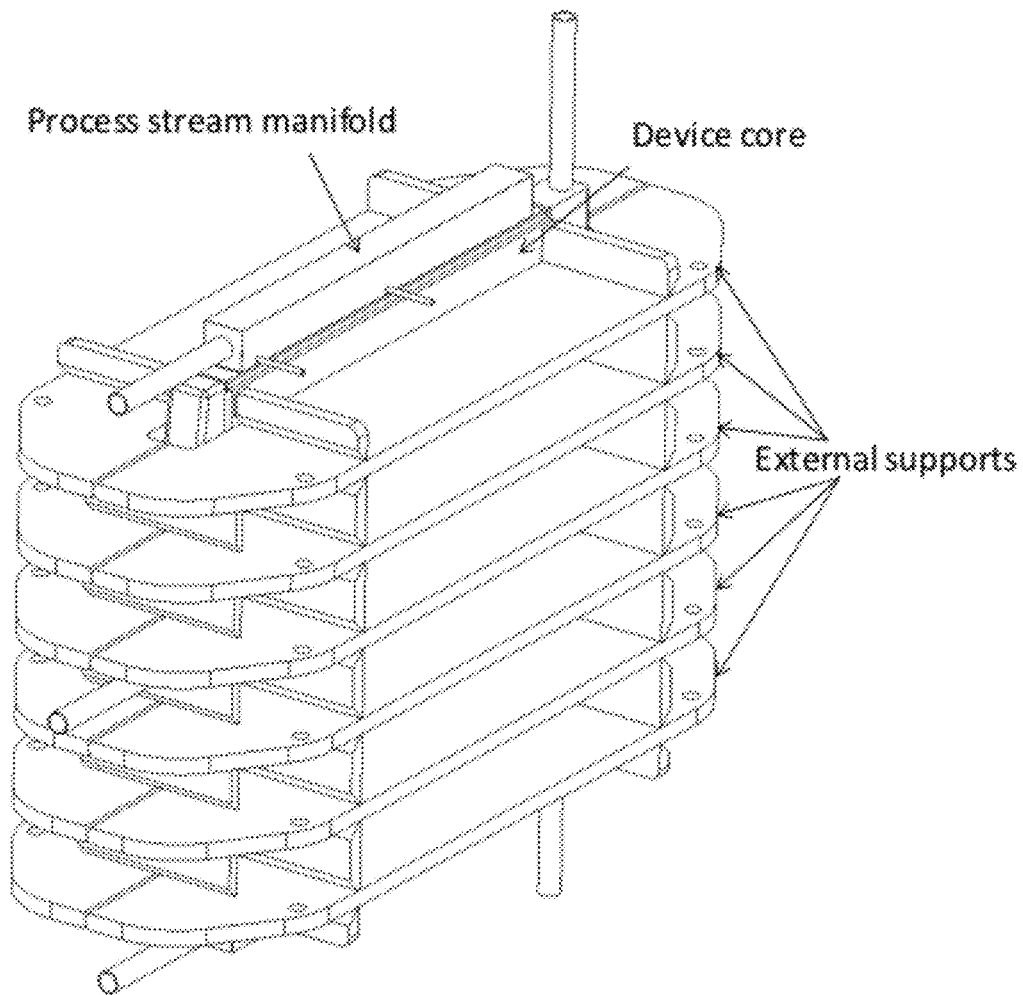
FIG. 17 illustrates the device of Example 8 including external supports. The device core was roughly 0.6-m by 0.6-m×0.08-m.

The welded reactor core was assembled from laser welded coolant subassemblies and welded into a final reactor. The reactor as then subsequently contained with an exoskeleton which permits high pressure service. For the Fischer Tropsch reactor, the hydrostatic pressure test is 855 psig (5895 kPa). Alternatively, a higher or lower hydrostatic pressure test could be used for Fischer Tropsch service depending on the final desired operating conditions. The described hydrostatic test in this example qualifies a reactor for service at a peak design temperature of 250 C and a peak design pressure of 562 psig (3875 kPa). The operating temperature and pressure would be lower than the peak design pressure to allow a margin of operating safety. For a desired higher operating pressure for a Fischer Tropsch reactor the spacing of external supports as shown in FIG. 17 would be decreased and additional supports added to qualify the reactor for a higher operating pressure.

Other reactions when operated at a higher temperature or pressure would be enabled by the inventive exoskeleton but may require additional supports which are more densely spaced. Alternatively, if a required process design pressure or temperature were lower, then a more sparsely populated welded support bars would be used. The inventive welded reactor can be operated at high temperature and high pressure without being disposed within a pressure containment vessel or without having a brazed or bonded reactor core.

The inventive exoskeleton allows for a reactor or device to pass a hydrostatic test whereby at a high internal pressure and a low external pressure the reactor retains mechanical integrity and is fit for service.

Example 9

Leak Test

All-Welded Device Leak Check Test

Summary

The all-welded FT devices were leak checked pneumatically up to and including 100 psig (690 kPa) on both the process and coolant sides, independently. In some embodiments, the leak check pressure may be as high as 200 psig (1380 kPa), or 500 psig (3450 kPa), and in one embodiment as high as 1000 psig (6900 kPa). Pressure drop over time is recorded to determine if the device leaks and interfaces are Snooped (leak-tested) to identify location of any leaks. To enable pressurization of either side, gasketed headers and footers are secured to the device via an all-thread clamping setup. The device is pressurized in increments of 10-20 psig (90-180 kPa), stopping after each increment to check the pressure drop rate, check the gaskets and all fittings for leaks and identify any leaks within the device.

Example 10

Ultra-Tall Fins Enabled by Inventive Reactor for Fischer Tropsch and Other Chemistries The all welded reactor where process layers (including fin structures) are placed adjacent to coolant subassemblies to form a final device assembly enables the use of unconventional process layers, including those with ultra tall fins. Ultra tall fins would create problems during brazing or bonding as they would provide little if any structural support during the bonding or brazing process and as such would sag, deform, or otherwise have a resultant structure that would require fixing or straightening prior to use—if even possible to do so. Excessive deformation from an ultra tall fin (such as about 0.5 in or 1.25 cm or greater) after brazing or bonding would render the device unusable.

Case A: Fin Height 0.225" (0.5625 cm)

A Fisher-Tropsch reaction is conducted in a microchannel reactor. The microchannel reactor contains a number of parallel process channels packed with FT catalyst. The reaction heat is removed by the coolant channels between the process channels where the water is the coolant. The removal of the reaction heat generated inside the catalyst bed is enhanced by the imbedded fin structure. The continuous fin inside the process channel, forms a series parallel flow paths. In this example, the fin is made of copper 110. The process channel height is 0.225" (0.5625 cm) and the length is 23" (57.5 cm). The fin has the same length and the spacing between the adjacent fin ribs is 0.04" (0.1 cm) and the fin thickness is 0.006" (0.015 cm). It is assumed there is no contact resistance between the fin and the process channel walls. The process channel wall thickness is 0.02" (0.05 cm) and made of stainless steel.

The process channel contains a certain amount of Co catalyst and is described in the first example. The void fraction of the catalyst bed is roughly 0.4 and the effective thermal conductivity is roughly 0.3 W/m-K. The catalyst loading is 1060 kg/m3.

The complex FT reactions are modeled as a simplified reaction network with 6 volumetric reactions (See Table 5). The parameters (Table 6) in the rate expressions are regressed using the catalyst test data in a lab scale FT reactor.

TABLE 5

FT Reactions and Kinetics

| ID | Reactions | Rate Expresssions |
|---|---|---|
| 1 | $3H_2 + CO \rightarrow H_2O + CH_4$ | $R_{CH4} = k_1 \exp(-E_1/RT)C_{H2}^1$ |
| 2 | $5H_2 + 2CO \rightarrow 2H_2O + C_2H_6$ | $R_{C2H6} = k_2 \exp(-E_2/RT)C_{H2}^1$ |
| 3 | $7H_2 + 3CO \rightarrow 3H_2O + C_3H_8$ | $R_{C3H8} = k_3 \exp(-E_3/RT)C_{H2}^1$ |
| 4 | $9H_2 + 4CO \rightarrow 4H_2O + C_4H_{10}$ | $R_{C4H10} = k_4 \exp(-E_4/RT)C_{H2}^1$ |
| 5 | $H_2O + CO \leftrightarrow H_2 + CO_2$ | $R_{CO2} = k_5 \exp(-E_5/RT)C_{CO}C_{H2O}$ |
| 6 | $29H_2 + 14CO \rightarrow 14H_2O + C_{14}H_{30}$ | $R_{FT} = \dfrac{k_6 \exp(-E_6/RT)C_{H2}C_{CO}}{[1 + k_{ad} \exp(-E_{ad}/RT)C_{CO}]^2}$ |

TABLE 6

Parameters in rate Expressions

| Reaction | $k_i$ rates in kmol/kg-cat s | $E_i$ J/kmol |
|---|---|---|
| 1 | 2.509 × 10$^9$ | 1.30 × 10$^8$ |
| 2 | 3.469 × 10$^7$ | 1.25 × 10$^8$ |
| 3 | 1.480 × 10$^7$ | 1.20 × 10$^8$ |
| 4 | 1.264 × 10$^7$ | 1.20 × 10$^8$ |
| 5 | 2.470 × 10$^7$ | 1.20 × 10$^8$ |
| 6 | 3.165 × 10$^4$ | 8.0 × 10$^7$ |

$k_{ad}$ = 63.5, $E_{ad}$ = 8.0 × 10$^7$ J/kmol

Here are the operating conditions used in the FT reactor models,
  Temperature on the process channel walls: 230 C
  Pressure at the beginning of the catalyst bed: 412 psig (2840 kPa)
  H2/CO ratio in the feed: 2.1.
  Nitrogen dilution in the feed: 31.3% (vol.)
  The process feed is preheated to the same temperature as on the channel walls.
  The feed flowrate over one unit catalyst packing of 0.04" (0.1 cm)×0.225" (0.563 cm)×23" (57.5 cm): 1197 SCCM. The contact time calculated based on the catalyst volume is 0.17 second.

Figure 20:
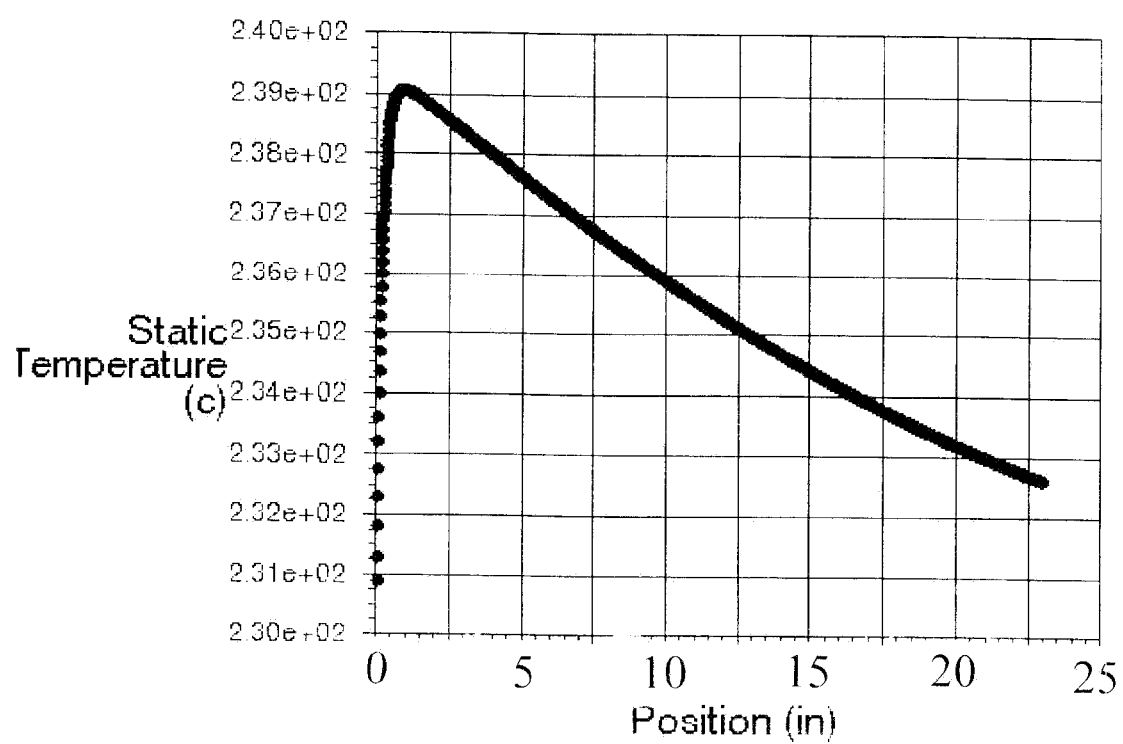
FIG. 20 shows a plot of catalyst temperature along centerline of the bed. Fin height at 0.225" (0.563 cm).

The predicted catalyst bed temperature as a function of the reactor length is shown in FIG. 20. The temperatures are sampled along the center of the catalyst bed so that the peak of the curve represents the maximum temperature of the catalyst bed. In this case, it is 239 C and located a short distance from the beginning of the catalyst bed. The CO conversion is projected at 76.0% and methane selectivity is at 15.3%

Case B: Fin Height 0.5" (1.25 cm)

A Fisher-Tropsch reaction is conducted in a microchannel reactor. The reactor configuration is similar to the reactor in Case A. The only difference is the process channel and the copper fin heights are 0.5" (1.25 cm). It would be expected that for a nominal 0.5" (1.25 cm) fin height, that the starting fin height would range between 0.501" (1.253 cm) and 0.052" (0.13 cm), with a preferred range of 0.504" (1.26 cm) to 0.510" (1.275 cm) placed next to nominal 0.5" (1.25 cm) high side bars or edge strips or p-strips.

In this example, operating conditions are the same, except the feed flowrate which is scaled up according to the total catalyst loading volume to keep the same reaction contact time at 0.17 second. The flowrate is 2661 SCCM.

The same catalyst and the kinetics are used in this example. The characteristics of the catalyst bed are also same as those in the Case A.

Figure 21:
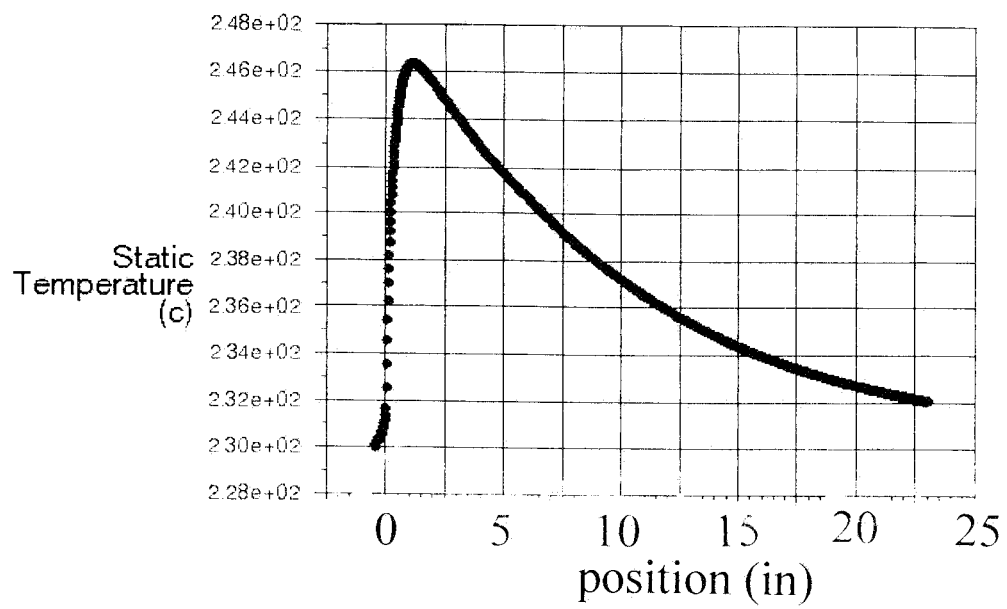
FIG. 21: Example 10: Catalyst temperature along centerline of the packed bed. Fin height at 0.5".

The predicted catalyst bed temperature as a function of the reactor length is shown in FIG. 21. The temperatures are sampled along the center of the catalyst bed so that the peak of the curve represents the maximum temperature of the catalyst bed. In this case, it is 246 C and located a short distance from the beginning of the catalyst bed. The CO conversion is projected at 81.9% and methane selectivity is at 17.0%. It would be expected operationally that the operating temperature as driven by the steam side pressure would likely be slightly reduced to 226 C to 229 C so that the CO conversion would be less than about 76% and the corresponding selectivity measurement would be expected to be slightly less than the predicted 17%. Overall, the reactor is predicted to still be within thermal control with a fin height of 0.5" (1.25 cm). It is anticipated that the inventive all-welded reactor could accommodate a 0.5" (1.25 cm) copper fin height for a Fischer Tropsch reactor. This move to an ultra tall fin (0.25" (0.625 cm) or greater) would not be possible to accommodate with either a stainless steel fin for Fischer Tropsch or for a brazed reactor. The ultra-tall fins from a brazed reactor would undergo considerable compression and collapse during the high temperature and high load brazing process. The use of the all welded reactor platform enables the more advantageous tall fin and ultra-tall fin Fischer Tropsch reactors.

Case C: Fin Height 1" (2.5 cm)

A Fisher-Tropsch reaction is conducted in a microchannel reactor. The reactor configuration is similar to the reactor in Case A. The only difference is the process channel and the copper fin heights are 1.0" (2.5 cm).

In this example, operating conditions are the same as those above, except the feed flowrate which is scaled up according to the total catalyst loading volume to keep the same reaction contact time at 0.17 second. The flowrate is 5321 SCCM.

The same catalyst and the kinetics are used in this example. The characteristics of the catalyst bed are also same as those in the Case A.

The predicted catalyst bed temperature as a function of the reactor length is shown in FIG. 22. The temperatures are sampled along the center of the catalyst bed so that the peak of the curve represents the maximum temperature of the catalyst bed. In this case, it is above 600 C. With the catalyst amount is roughly 4 times of that in the FT reactor in Case A, the total reaction heat passing through each fin rib is increased by the same scaling factors. At this level of the reaction heat, even the low heat transfer resistance inside the copper ribs becomes critical. This can be seen from the significant fin temperature variation from the center to the edge. Due to the high temperature on large part of the catalyst bed, the CO conversion is projected above 90% and methane selectivity is also significantly higher than the cases of shorter fin heights. It is expected that for this type of exotherm that the FT catalyst would quickly deactivate and that correspondingly the exotherm would continue to move downstream in the axial location much akin to a burning cigar. After burning out the FT catalyst, the overall conversion would be low (less than 40% per pass for similar flow, temperature, and pressure conditions) and the corresponding methane would be high (greater than 10%).

The aforementioned examples assume perfect thermal contact of the fin to the wall and perfect flow distribution on the coolant side with no blocked or low flow coolant channels. It is expected for a real manufactured large scale reactor with use of a particulate FT catalyst that a robust fin height is preferably less than 1.3 cm (0.5 inch) to accommodate manufacturing imperfections or operational imperfections due to potential fouling on the coolant side during operation.

What is claimed:

1. A laminated microchannel assembly comprising a first sheet and a second sheet;
  wherein each sheet has a length and a width, wherein the cross section defined by the sheet length multiplied by the sheet width is greater than 100 cm2;
  wherein the first and second sheets are substantially flat;
  wherein the first sheet comprises an array of parallel microchannels, wherein the microchannels are separated from each other by a barrier wall;
  wherein the first sheet and the second sheet are adjacent; and
  comprising welds that run along the length of the barrier walls and join the first sheet to the second sheet.

2. The microchannel assembly of claim 1 wherein the cross section defined by the sheet length multiplied by the sheet width is greater than 500 cm2.

3. The microchannel assembly of claim 1 wherein the welds are continuous and form seals between the microchannels in the array of parallel microchannels, and wherein the seals are not diffusion bonded or brazed.

4. The microchannel assembly of claim 1 wherein the welds on the second sheet have a linear density of at least 2.7 cm/cm2.

5. The microchannel assembly of claim 1 wherein the welds are laser welds having a width of 0.015 cm or greater.

6. The microchannel assembly of claim 1 wherein the first and second sheets comprise a first fluid subassembly; and further comprising a second fluid passageway:
  wherein the second fluid passageway comprises multiple continuous fluid passageways, and wherein the first subassembly and second fluid passageway are joined by a weld along the perimeter of the subassembly and second fluid passageway.

7. The microchannel assembly of claim 6 wherein the exterior of the second passageway is sealed with the use of edge strips that are welded to the first subassembly via fillet welds.

8. The microchannel assembly of claim 6 comprising a top sheet having a thickness in the range of 0.04 cm to 0.2 cm; wherein the first subassembly constitutes a coolant layer; wherein the second fluid passageway constitutes a process layer and wherein the microchannel assembly comprises two of the process layers interleaved between 3 of the coolant layers.

9. The microchannel assembly of claim 6 wherein the second fluid passageway is a process layer that comprises a copper waveform and hydrogen gas; and wherein the copper waveform is held in place by being compressed and is not brazed, bonded, or welded at all contact points with the first subassembly.

10. A laminated device made by a method comprising:
  providing a first subassembly or a first sheet and a second subassembly or a second sheet; wherein the first subassembly or first sheet comprises a first parallel array of channels and wherein the second subassembly or second sheet comprises a second parallel array of channels and wherein there is no intersection between channels in the first subassembly or first sheet and the second subassembly or second sheet;
  welding an edge of the first assembly to an edge of the second assembly to form a combined subassembly layer of welding edges of the first and second sheets to form a welded single sheet;
  and stacking the combined layer or welded single sheet with one or more layers or sheets, and joining the stacked layers or sheets to form a laminated device;
  the laminated device having mutually perpendicular dimensions of height, length and width;
  wherein height refers to the stacking direction; length is parallel to the net direction of flow through the device; and wherein the step of welding an edge forms the welded single sheet having an increased dimension in the width direction.

11. A laminated microchannel device having a length and a width, wherein the cross section defined by the sheet length multiplied by the sheet width is greater than 100 cm2 and, is joined with a top plate to form a welded assembly with a linear density of laser welded joint of between 0.05 to 20 cm/cm2 over a section of a surface of a sheet within the microchannel device; this section comprises at least 50% of contiguous area of a major surface.

12. The laminated microchannel device of claim 11 wherein the cross section defined by the sheet length multiplied by the sheet width is greater than 500 cm2 and, is joined with a top plate to form a welded assembly with a linear density of laser welded joint of between 0.05 to 20 cm/cm2 over a section of a surface of a sheet within the microchannel device; wherein this section comprises 100% of a major surface; wherein the welds hold together two or more sheets and provide for sealing between adjacent interior flow channels within a first subassembly; and further comprising a second fluid passageway that is stacked on the first subassembly:
  wherein the second fluid passageway comprises multiple continuous fluid passageways, and
  wherein the first subassembly and second fluid passageway are joined by a weld along the perimeter of the subassembly and second fluid passageway.

13. The laminated device of claim 11 wherein the device is a chemical processor.

14. The laminated device of claim 11 wherein there is not an interlayer of material between the sheet in the device and the top plate; and the weld along the perimeter is a fillet weld.

15. The laminated device of claim 12 wherein the top plate has a thickness in the range of 0.04 cm to 0.2 cm; and wherein the second fluid passageway is press fit onto the first subassembly without diffusion bonding or brazing.

16. The laminated device of claim 11 that is joined with the top plate to form a welded assembly with a linear density of laser welded joint of between 0.05 to 20 cm/cm2 over a section of a surface of a sheet within the microchannel device; this section comprises at least 90% of contiguous area of a major surface.

17. A laminated device comprising: a stack of sheets joined by welding;
  the stack of sheets comprising
  a core stack of sheets joined by welding along the perimeter of the sheets; and a strain relief joint within the stack of sheets;
  wherein the strain relief joint comprises two adjacent sheets that are held within the stack but are substantially not joined to each other along the perimeter of two adjacent sheets.

18. The laminated device of claim 17 wherein the stress relief expansion joint is made up of a lower plate and a top plate, wherein the top plate is nearer an exterior major surface of the stack, and wherein the lower plate contains a plurality of holes and the top plate is featureless.

19. The laminated device of claim 17 wherein the two adjacent sheets are not joined except at the corners.

20. The laminated device of claim 17 wherein the device is a chemical processor.

21. The laminated device of claim 20 wherein the chemical processor is a reactor having a reactor core and comprising the strain relief joint at the top of the core; and a second second strain relief joint comprising two adjacent sheets that are held within the stack but are substantially not joined to each other along the perimeter of two adjacent sheets, wherein the second second strain relief joint is disposed at the bottom of the core.

22. The laminated device of claim 20 wherein the chemical processor is a reactor having a reactor core and wherein one sheet of the strain relief joint is placed against the reactor core and the stress relief joint is welded to a coolant subassembly.

* * * * *